US012786591B2

(12) United States Patent
Nakayama et al.

(10) Patent No.: US 12,786,591 B2
(45) Date of Patent: Nov. 3, 2026

(54) IMAGE SENSOR AND OPERATION METHOD OF PIXEL CIRCUIT THEREOF

(71) Applicant: OMNIVISION TECHNOLOGIES, INC., Santa Clara, CA (US)

(72) Inventors: Satoshi Nakayama, Sagamihara (JP); Shunsuke Suzuki, Tokyo (JP); Seungju Seo, Tokyo (JP); Yoshikazu Nitta, Tokyo (JP)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/984,911

(22) Filed: Dec. 17, 2024

(65) Prior Publication Data

US 2026/0172713 A1 Jun. 18, 2026

(51) Int. Cl.

*H04N 5/335* (2011.01)
*H04N 25/59* (2023.01)
*H04N 25/621* (2023.01)
*H04N 25/771* (2023.01)

(52) U.S. Cl.

CPC ........... *H04N 25/771* (2023.01); *H04N 25/59* (2023.01); *H04N 25/621* (2023.01)

(58) Field of Classification Search

CPC .................................................... H04N 25/771
See application file for complete search history.

(56) References Cited

U.S. PATENT DOCUMENTS

| | | | | |
|---|---|---|---|---|
| 12,177,589 B2 * | 12/2024 | Phan | | H04N 25/621 |
| 12,185,000 B2 * | 12/2024 | Mabuchi | | H04N 25/46 |
| 12,294,799 B2 * | 5/2025 | Choi | | H04N 25/75 |
| 2024/0244350 A1 | 7/2024 | Phan et al. | | |

FOREIGN PATENT DOCUMENTS

| | | | | |
|---|---|---|---|---|
| CN | 114143483 | | 3/2022 | |
| CN | 115088074 | | 9/2022 | |
| CN | 121604542 A | * | 3/2026 | H10F 39/811 |

* cited by examiner

*Primary Examiner* — Gary C Vieaux

(74) *Attorney, Agent, or Firm* — JC ONE WORLD

(57) ABSTRACT

An image sensor and an operation method of a pixel circuit thereof are provided. In the pixel circuit, a transfer transistor is coupled between a photosensitive element and a floating diffusion portion. The pixel circuit selectively operates in one of a low illumination sensing mode and a high illumination sensing mode. When the pixel circuit operates in the low illumination sensing mode, a control voltage with a first level is applied to a control terminal of the transfer transistor during an integration period, and therefore the transfer transistor is turned off. When the pixel circuit operates in the high illumination sensing mode, the control terminal of the transfer transistor is applied with the control voltage with a second level higher than the first level during the integration period, and therefore the transfer transistor is turned off.

26 Claims, 16 Drawing Sheets

IMAGE SENSOR AND OPERATION METHOD OF PIXEL CIRCUIT THEREOF

BACKGROUND

Technical Field

The disclosure relates to an electronic circuit, and particularly relates to an image sensor and an operation method of a pixel circuit thereof.

Description of Related Art

Image sensors are widely used in medical, automotive, and other applications such as digital cameras, mobile phones, and security cameras. General image sensors have a limited dynamic range of about 60 dB to 70 dB while the brightness dynamic range in the real world is much larger. For instance, the brightness dynamic range of a natural scene is typically 90 dB or even larger. To capture the details in both bright highlights and dark shadows, image sensors may use high dynamic range (HDR) technology to increase the dynamic range captured. Automotive or other applications have an increasing need for very high level of dynamic range to accommodate a brighter light level. How to realize an image sensor with a high dynamic range is one of the many technical challenges in this field.

SUMMARY

The disclosure provides an image sensor and an operation method of a pixel circuit thereof, which realize high dynamic range (HDR).

According to an embodiment of the disclosure, the image sensor includes a control circuit and a pixel array. The pixel array is controlled by the control circuit. Each pixel circuit of the pixel array includes: a first photosensitive element, a floating diffusion portion, a first transfer transistor, a source follower circuit, a dual floating diffusion transistor, and a first capacitor. The first transfer transistor is coupled between the first photosensitive element and the floating diffusion portion. The source follower circuit is coupled between a corresponding readout line of the pixel array and the floating diffusion portion. A first terminal of the dual floating diffusion transistor is coupled to the floating diffusion portion. A first terminal of the first capacitor is coupled to a second terminal of the dual floating diffusion transistor. Each pixel circuit of the pixel array selectively operates in one of a low illumination sensing mode and a high illumination sensing mode based on control of the control circuit. In response to the pixel circuit operating in the low illumination sensing mode, the control circuit applies a control voltage with a first level to a control terminal of the first transfer transistor during an integration period to turn off the first transfer transistor. In response to the pixel circuit operating in the high illumination sensing mode, the control circuit applies the control voltage with a second level higher than the first level to the control terminal of the first transfer transistor during the integration period to turn off the first transfer transistor.

According to an embodiment of the disclosure, the operation method includes: selectively operating a pixel circuit in one of a low illumination sensing mode and a high illumination sensing mode; performing a precharge operation on the pixel circuit to reset a first photosensitive element, a floating diffusion portion, and a first capacitor; in response to the pixel circuit operating in the low illumination sensing mode, applying a control voltage with a first level to a control terminal of a first transfer transistor during an integration period after the precharge operation to turn off the first transfer transistor; and in response to the pixel circuit operating in the high illumination sensing mode, applying the control voltage with a second level higher than the first level to the control terminal of the first transfer transistor during the integration period to turn off the first transfer transistor.

According to an embodiment of the disclosure, the image sensor includes a control circuit and a pixel array. The pixel array is controlled by the control circuit. Each pixel circuit of the pixel array includes: a photosensitive element, a floating diffusion portion, a transfer transistor, a source follower circuit, a dual floating diffusion transistor, an overflow storage portion, and an overflow transistor. The transfer transistor is coupled between the photosensitive element and the floating diffusion portion. The source follower circuit is coupled between a corresponding readout line of the pixel array and the floating diffusion portion. A first terminal of the dual floating diffusion transistor is coupled to the floating diffusion portion. The overflow storage portion is coupled to a second terminal of the dual floating diffusion transistor. A first terminal of the overflow transistor is coupled to the photosensitive element. A second terminal of the overflow transistor is coupled to the overflow storage portion. Each pixel circuit of the pixel array selectively operates in one of a low illumination sensing mode and a high illumination sensing mode based on control of the control circuit. In response to the pixel circuit operating in the low illumination sensing mode, the control circuit applies a control voltage with a first level to a control terminal of the overflow transistor during an integration period to turn off the overflow transistor. In response to the pixel circuit operating in the high illumination sensing mode, the control circuit applies the control voltage with a second level higher than the first level to the control terminal of the overflow transistor during the integration period to turn off the overflow transistor.

According to an embodiment of the disclosure, the operation method includes: selectively operating a pixel circuit in one of a low illumination sensing mode and a high illumination sensing mode; performing a precharge operation on the pixel circuit to reset a first photosensitive element, a floating diffusion portion, and an overflow storage portion; in response to the pixel circuit operating in the low illumination sensing mode, applying a control voltage with a first level to a control terminal of an overflow transistor during an integration period to turn off the overflow transistor; and in response to the pixel circuit operating in the high illumination sensing mode, applying the control voltage with a second level higher than the first level to the control terminal of the overflow transistor during the integration period to turn off the overflow transistor.

Based on the above, each pixel circuit of the image sensor selectively operates in one of the low illumination sensing mode and the high illumination sensing mode to realize the HDR function. When the pixel circuit operates in the low illumination sensing mode, the control voltage with the first level is applied to the control terminal of the first transfer transistor during the integration period, so that the first photosensitive element has an appropriate full well capacity (FWC). In response to the pixel circuit operating in the low illumination sensing mode, the floating diffusion portion or the overflow storage portion is continuously reset during the integration period. In response to the pixel circuit operating in the high illumination sensing mode, the floating diffusion portion or the overflow storage portion stops being reset during the integration period to store the overflow charges from the first photosensitive element. The overflow charges may lower the voltage of the floating diffusion portion or the overflow storage portion. However, when the voltage of the floating diffusion portion or the overflow storage portion becomes lower, the overflow barrier under the first transfer transistor or the overflow transistor becomes higher (that is, it becomes more difficult for the overflow charges of the first photosensitive element to pass through the first transfer transistor to the floating diffusion portion, or pass through the overflow transistor to the overflow storage portion), which increases the risk of blooming effect (that is, the photosensitive charges of the first photosensitive element overflow to adjacent pixels). To reduce the risk, when the pixel circuit operates in the high illumination sensing mode, the control voltage with the higher second level (the second level is higher than the first level) is applied to the control terminal of the first transfer transistor or the overflow transistor during the integration period to turn off the first transfer transistor. The higher control voltage ensures that the overflow charges of the first photosensitive element overflow through the first transfer transistor to the floating diffusion portion, or through the overflow transistor to the overflow storage portion to reduce the risk of blooming. Therefore, the image sensor achieves blooming suppression.

To make the aforementioned features and advantages of the disclosure more comprehensible, exemplary embodiments are described in detail hereinafter in conjunction with the accompanying figures.

DESCRIPTION OF THE EMBODIMENTS

Figure 1:
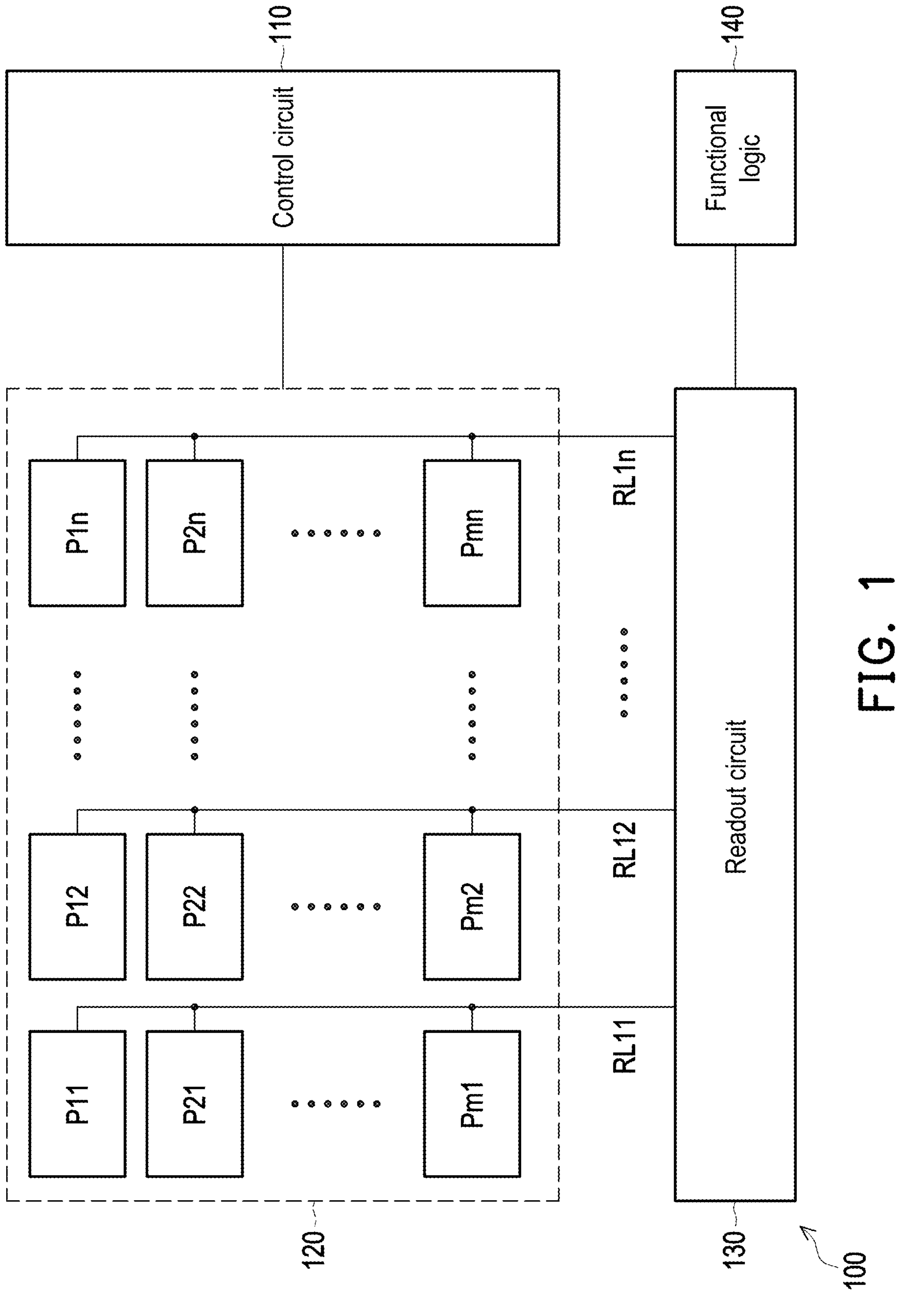
FIG. 1 is a circuit block diagram of an image sensor according to an embodiment of the disclosure.

The term "couple (or connect)" used in this specification (including the claims) may refer to any direct or indirect connection means. For example, when it is described that the first device is coupled (or connected) to the second device, it should be interpreted that the first device may be directly connected to the second device, or the first device may be indirectly connected to the second device through other devices or some connection means. The terms "first", "second", and so on used in this specification (including the claims) are used to name the elements or distinguish different embodiments or ranges, and are not intended to define the upper or lower limit of the number of elements nor to limit the order of elements. In addition, elements/structures/steps denoted by the same reference numerals in the drawings and embodiments represent the same or similar parts as appropriate. Descriptions of elements/structures/steps using the same reference numerals or the same names in different embodiments may serve as reference for each other.

Image sensor technology advances rapidly. The demand for higher resolution and lower power consumption has motivated manufacturers to further miniaturize HDR devices. As a consequence, pixel circuits become susceptible to dark current (DC, which is a current that exists in the absence of excitation light or with extremely low level of excitation light) and white pixel (WP, which is the occurrence rate of saturated or near-saturated pixels).

Exemplary embodiments of an image sensor and an operation method of a pixel circuit thereof will be described in detail hereinafter. The image sensor includes a pixel array with multiple pixel circuits. The pixel circuit includes a floating diffusion portion and a lateral overflow integration capacitor (LOFIC). In the LOFIC pixels of the image sensor, when the photodiode (PD) becomes saturated with signal electrons (photosensitive charges) due to irradiation of incident light, excess electrons (overflow charges) overflow to the floating diffusion portion and the LOFIC. Since the LOFIC has a larger capacity (compared to the floating diffusion portion), the LOFIC can accumulate many signal electrons, thereby achieving HDR.

Each pixel circuit of the image sensor selectively operates in one of a low illumination sensing mode (normal mode) and a high illumination sensing mode (LOFIC mode) to achieve HDR. When the pixel circuit operates in the low illumination sensing mode, the floating diffusion portion and the LOFIC are maintained in a reset state during the integration period (that is, exposure period), and the pixel circuit senses low illumination incident light using a photosensitive element (for example, a photodiode or other photosensitive element). When the pixel circuit operates in the high illumination sensing mode, the floating diffusion portion and the LOFIC stop resetting during the integration period to store overflow charges (generally signal electrons) from the photosensitive element. In the high illumination sensing mode, the LOFIC may increase the full well capacity (FWC) of the pixel circuit to sense high illumination incident light, which enables the image sensor to realize the HDR function.

Generally, a lower control voltage is necessary for Si surface pinning under the transfer transistor to suppress dark current due to the dangling bond of Si or $SiO_2$ boundary. Typically, a relatively higher control voltage is unfavorable for dark performance (dark current, white pixel). However, in the LOFIC mode, the degradation of dark performance may be negligible from the viewpoint of signal-to-noise ratio (SNR) because the LOFIC mode is mainly used in the case where there is a lot of incident light. In the case where incident light is not very strong, the pixel circuit may use the normal mode instead of the LOFIC mode. By using different bias voltages in the normal mode and the LOFIC mode (the transfer transistor uses a lower control voltage in the normal mode and a higher control voltage in the LOFIC mode), it is possible to prevent the full well capacity (FWC) of the photosensitive element from dropping in the normal mode, and also avoid blooming (overflow of signal electrons from the photosensitive element to adjacent pixels) of the photosensitive element in the LOFIC mode.

From the characteristics of the LOFIC mode, when there is a lot of incident light, excess electrons from the photosensitive element may overflow through the transfer transistor to the floating diffusion portion, thus lowering the voltage of the floating diffusion portion. The overflow from the photosensitive element to the floating diffusion portion is also necessary to maintain proper operation of the LOFIC pixel. However, when the voltage of the floating diffusion portion is lower, the overflow barrier under the transfer transistor becomes higher, which increases the risk of blooming. To avoid this issue, the following exemplary embodiments "adjust the control voltage of the transfer transistor" to moderately lower the overflow barrier of the transfer transistor in the LOFIC pixel (to be relatively lower than the overflow barrier in the normal mode). By moderately lowering the overflow barrier of the transfer transistor during the integration period, excess electrons from the photosensitive element can easily overflow through the transfer transistor to the floating diffusion portion even when the voltage of the floating diffusion portion is lower.

FIG. 1 is a circuit block diagram of an image sensor 100 according to an embodiment of the disclosure. The image sensor 100 shown in FIG. 1 includes a control circuit 110, a pixel array 120, a readout circuit 130, and functional logic 140. The pixel array 120 is controlled by the control circuit 110. The pixel array 120 includes multiple pixel circuits (for example, pixel circuits P11, P12, . . . , P1*n*, P21, P22, . . . , P2*n*, Pm1, Pm2, . . . , Pmn shown in FIG. 1). Each of the pixel circuits P11 to Pmn is coupled to a corresponding readout line (bit line) of the pixel array 120. For example, the pixel circuits P11 to Pm1 are coupled to a readout line RL11, the pixel circuits P12 to Pm2 are coupled to a readout line RL12, and the pixel circuits P1*n* to Pmn are coupled to a readout line RL1*n*.

In each of the pixel circuits P11 to Pmn, a floating diffusion portion (not shown in FIG. 1) and at least one photosensitive element (not shown in FIG. 1), which is for example a photodiode, are disposed to generate photosensitive charges in response to incident light. Each of the pixel circuits P11 to Pmn selectively operates in one of a low illumination sensing mode and a high illumination sensing mode, so that the pixel circuits P11 to Pmn can realize the HDR function and provide HDR image signals. When the pixel circuits P11 to Pmn operate in the low illumination sensing mode, the floating diffusion portions or the overflow storage portion of the pixel circuits P11 to Pmn are maintained in the reset state during the integration period, and the pixel circuits P11 to Pmn use the photosensitive elements to sense low illumination incident light. When the pixel circuits P11 to Pmn operate in the high illumination sensing mode, the floating diffusion portions or the overflow storage portion of the pixel circuits P11 to Pmn stop resetting during the integration period to store overflow charges from the photosensitive elements. Therefore, in the high illumination sensing mode, the full well capacity (FWC) of the pixel circuits P11 to Pmn is increased to sense high illumination incident light.

A source follower circuit and a floating diffusion portion (not shown in FIG. 1) in the pixel circuits P11 to Pmn then converts the photosensitive charges into a pixel signal. The readout circuit 130 reads out the pixel signals of the pixel circuits P11 to Pmn via the readout lines RL11 to RL1*n*. Based on the actual circuit design, the readout circuit 130 may further include an analog to digital converter and other circuits to convert the pixel signals into image data. The readout circuit 130 then provides the image data to the functional logic 140. The functional logic 140 is capable of performing image processing (for example, cropping, rotation, red-eye removal, brightness adjustment, contrast adjustment, or other image processing) on the image data.

The control circuit 110 is coupled to the pixel array 120 to control the sensing operations of the pixel circuits P11 to Pmn in the pixel array 120. For example, the control circuit 110 may generate a rolling shutter signal or a shutter signal for controlling image acquisition. In other embodiments, image acquisition may be synchronized with lighting effects such as flash. In some embodiments, the control circuit 110, the readout circuit 130, and/or the functional logic 140 may be implemented as hardware circuits according to different circuit designs. In other embodiments, the control circuit 110, the readout circuit 130, and/or the functional logic 140 may be implemented as one of multiple combinations of hardware, firmware, and software (that is, programs).

In terms of hardware, the control circuit 110, the readout circuit 130, and/or the functional logic 140 may be implemented as a logic circuit on an integrated circuit. For example, the functions of the control circuit 110, the readout circuit 130, and/or the functional logic 140 may be implemented in various logic blocks, modules, and circuits in one or more hardware controllers, microcontrollers, hardware processors, microprocessors, application-specific integrated circuits (ASICs), digital signal processors (DSPs), field programmable gate arrays (FPGAs), central processing units (CPUs), and/or other processing units. The functions of the control circuit 110, the readout circuit 130, and/or the functional logic 140 may be implemented as hardware circuits, such as various logic blocks, modules, and circuits in an integrated circuit, using hardware description languages (such as Verilog HDL or VHDL) or other suitable programming languages.

In one embodiment, the image sensor 100 may be implemented on a single semiconductor wafer. In another embodiment, the image sensor 100 may be implemented on stacked semiconductor wafers. For example, the pixel array 120 may be implemented on a pixel wafer, and the readout circuit 130, the control circuit 110, and the functional logic 140 may be implemented on an ASIC wafer, in which the pixel wafer and the ASIC wafer are stacked and interconnected through bonding or through substrate vias (TSVs). In practical applications, the bonding may be hybrid bonding, oxide bonding, or other bonding. As another example, the pixel array 120 and the control circuit 110 may be implemented on a pixel wafer, and the readout circuit 130 and the functional logic 140 may be implemented on an ASIC wafer.

In terms of software and/or firmware, the functions of the control circuit 110, the readout circuit 130, and/or the functional logic 140 may be implemented as programming codes. For example, general programming languages (such as C, C++, or composition language) or other suitable programming languages may be used to implement the control circuit 110, the readout circuit 130, and/or the functional logic 140. The programming codes may be recorded/stored in a "non-transitory machine-readable storage medium". In some embodiments, the non-transitory machine-readable storage medium may include, for example, a semiconductor memory and/or a storage device. An electronic device (such as computer, CPU, hardware controller, microcontroller, hardware processor, or microprocessor) may read and execute the programming codes from the non-transitory machine-readable storage medium to implement the functions of the control circuit 110, the readout circuit 130, and/or the functional logic 140.

In practical applications, the image sensor 100 may be included in a cell phone, a laptop computer, an endoscope, a security camera, an imaging device for automobile, or other application products. Besides, the image sensor 100 may be coupled to other hardware components, such as processors (general-purpose processors or other processors), memory components, output components (USB ports, wireless transmitters, HDMI ports, etc.), lighting/flash components, electronic input components (keyboards, touch displays, trackpads, mice, microphones, etc.), displays, or the like. Other hardware components may send instructions to the image sensor 100 and extract image data from the image sensor 100.

Figure 2:
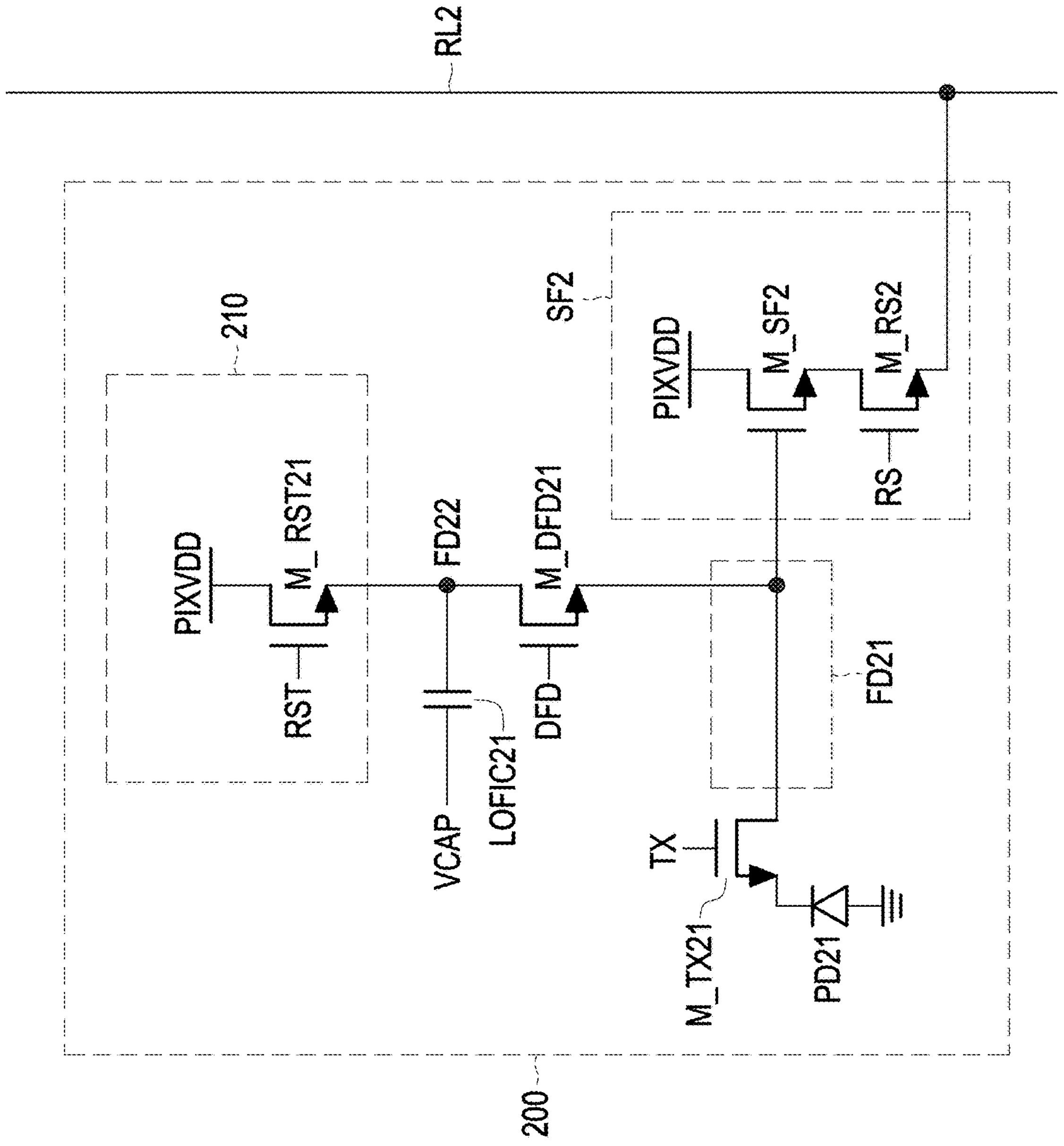
FIG. 2 is a circuit block diagram of a pixel circuit according to an embodiment of the disclosure.

FIG. 2 is a circuit block diagram of a pixel circuit 200 according to an embodiment of the disclosure. The pixel circuit 200 and a readout line RL2 shown in FIG. 2 may serve as one of many exemplary embodiments of the pixel circuits P11 to Pmn and the readout lines RL11 to RL1*n* shown in FIG. 1. For details of the pixel circuit 200 and the readout line RL2 shown in FIG. 2, please refer to the above descriptions of the pixel circuits P11 to Pmn and the readout lines RL11 to RL1*n* shown in FIG. 1. In the embodiment shown in FIG. 2, the pixel circuit 200 includes a photosensitive element (for example, a photodiode PD21 or other photosensitive elements), a floating diffusion portion FD21, a transfer transistor M_TX21, a source follower circuit SF2, a dual floating diffusion transistor M_DFD21, a capacitor (for example, LOFIC LOFIC21), and a reset circuit 210. The photodiode PD21 generates photosensitive charges in response to incident light. The transfer transistor M_TX21 is coupled between the photodiode PD21 and the floating diffusion portion FD21. In an environment of medium or high illumination, excess photosensitive charges of the photodiode PD21 may overflow to the floating diffusion portion FD21 through the transfer transistor M_TX21.

The control terminal (for example, gate) of the transfer transistor M_TX21 is coupled to the control circuit 110 to receive a control voltage TX. In response to the control voltage TX, the transfer transistor M_TX21 determines whether to transfer the photosensitive charges of the photodiode PD21 to the floating diffusion portion FD21. The capacity of the floating diffusion portion FD21 is provided by a physical capacitor (not shown) and/or a parasitic capacitor (not shown) in the floating diffusion portion FD21. Generally, the floating diffusion portion FD21 has a relatively small capacity to facilitate a high conversion gain (HCG) readout operation.

The source follower circuit SF2 is coupled between the corresponding readout line RL2 of the pixel array and the floating diffusion portion FD21. In the embodiment shown in FIG. 2, the source follower circuit SF2 includes a source follower transistor M_SF2 and a row select transistor M_RS2. The control terminal (for example, gate) of the source follower transistor M_SF2 is coupled to the floating diffusion portion FD21. The first terminal (for example, drain) of the source follower transistor M_SF2 is coupled to a pixel voltage source PIXVDD. The control terminal (for example, gate) of the row select transistor M_RS2 is coupled to the control circuit 110 to receive a row select signal RS. The first terminal (for example, drain) of the row select transistor M_RS2 is coupled to the second terminal (for example, source) of the source follower transistor M_SF2. The second terminal (for example, source) of the row select transistor M_RS2 is coupled to the corresponding readout line RL2.

The dual floating diffusion transistor M_DFD21 may serve as a dual floating diffusion (DFD) transistor. The control terminal (for example, gate) of the dual floating diffusion transistor M_DFD21 is coupled to the control circuit 110 to receive a dual floating diffusion signal DFD. The first terminal (for example, source) of the dual floating diffusion transistor M_DFD21 is coupled to the floating diffusion portion FD21. The second terminal (for example, drain) of the dual floating diffusion transistor M_DFD21 is coupled to a floating diffusion node FD22. The first terminal of the LOFIC LOFIC21 is coupled to the second terminal of the dual floating diffusion transistor M_DFD21. The second terminal of the LOFIC LOFIC21 is coupled to the control circuit 110 to receive a floating diffusion capacitor signal VCAP. The capacity of the LOFIC LOFIC21 is greater than the capacity of the floating diffusion portion FD21. Based on the actual design, the LOFIC LOFIC21 may include a metal-oxide-metal (MOM) capacitor, a three-dimensional (3D) metal-insulator-metal (MIM) capacitor, a metal oxide semiconductor (MOS) capacitor, or other capacitor components. In response to the pixel circuit 200 operating in the high illumination sensing mode, the floating diffusion portion FD21 and the LOFIC LOFIC21 may receive and store excess photosensitive charges (overflow charges) from the photodiode PD21 through the transfer transistor M_TX21 and the dual floating diffusion transistor M_DFD21 during the integration period. Therefore, the pixel circuit 200 can sense high illumination incident light in the high illumination sensing mode.

The second terminal (for example, drain) of the dual floating diffusion transistor M_DFD21 is coupled to the reset circuit 210. The reset circuit 210 is controlled by the control circuit 110 to selectively reset the pixel circuit 200. In the embodiment shown in FIG. 2, the reset circuit 210 includes a reset transistor M_RST21. The reset transistor M_RST21 is coupled between the second terminal of the dual floating diffusion transistor M_DFD21 and a reset voltage source (for example, pixel voltage source PIXVDD or other voltage sources). The reset transistor M_RST21 switches in response to the reset signal RST from the control circuit 110. For example, in response to the pixel circuit 200 operating in the low illumination sensing mode, the reset transistor M_RST21 is turned on during the integration period. In response to the pixel circuit 200 operating in the high illumination sensing mode, the reset transistor M_RST21 is turned off during the integration period.

Figure 3:
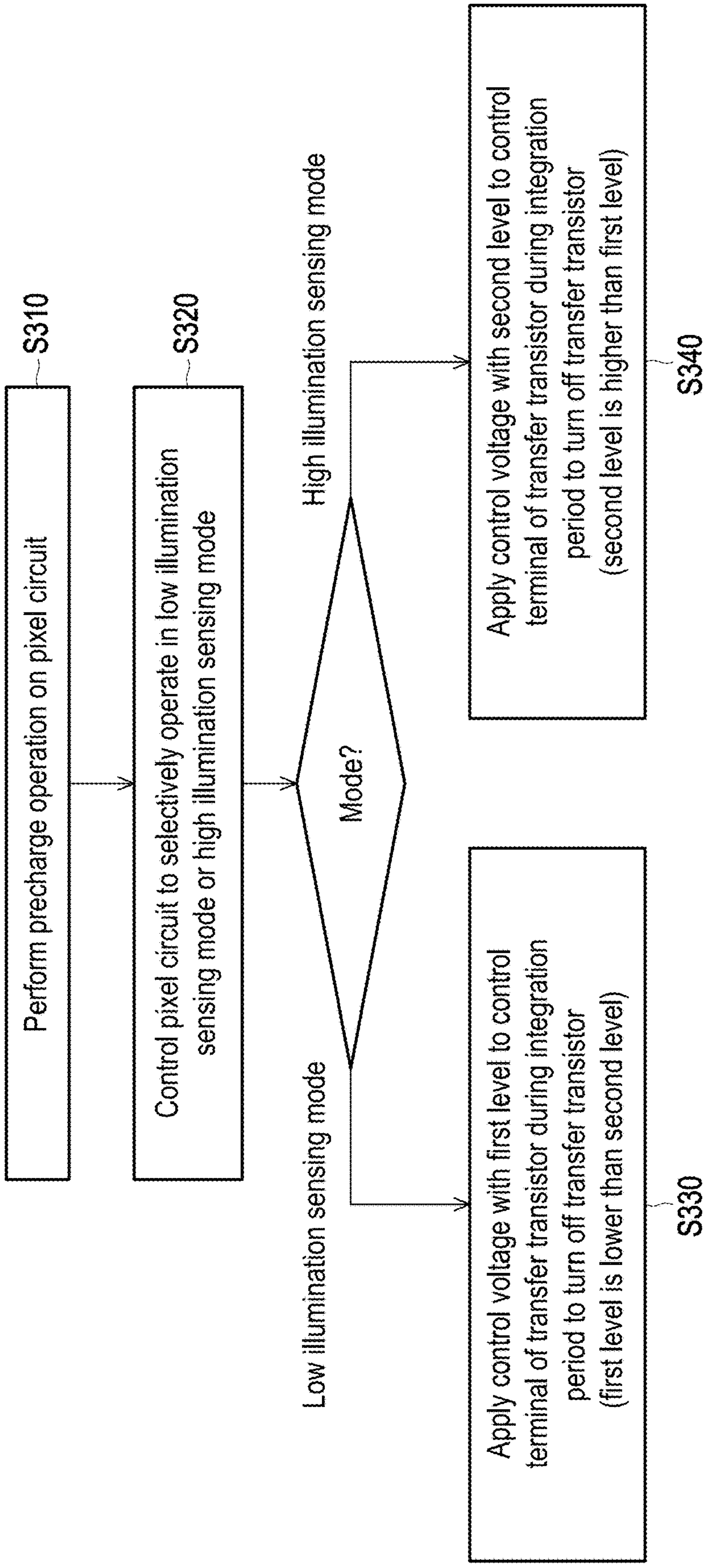
FIG. 3 is a flow chart of an operation method of a pixel circuit according to an embodiment of the disclosure.

FIG. 3 is a flow chart of an operation method of a pixel circuit according to an embodiment of the disclosure. Referring to FIG. 1, FIG. 2, and FIG. 3, the control circuit 110 performs a precharge operation on the pixel circuit 200 in step S310 to reset the photodiode PD21, the floating diffusion portion FD21, and the LOFIC LOFIC21. Based on the control of the control circuit 110, the pixel circuit 200 selectively operates in one of the low illumination sensing mode and the high illumination sensing mode (step S320). In response to the pixel circuit 200 operating in the low illumination sensing mode, the control circuit 110 applies the control voltage TX at a first level to the control terminal of the transfer transistor M_TX21 during the integration period to turn off the transfer transistor M_TX21 (step S330). The first level may be defined according to the actual design and application. For example, the first level may be a negative voltage level.

Figure 4:
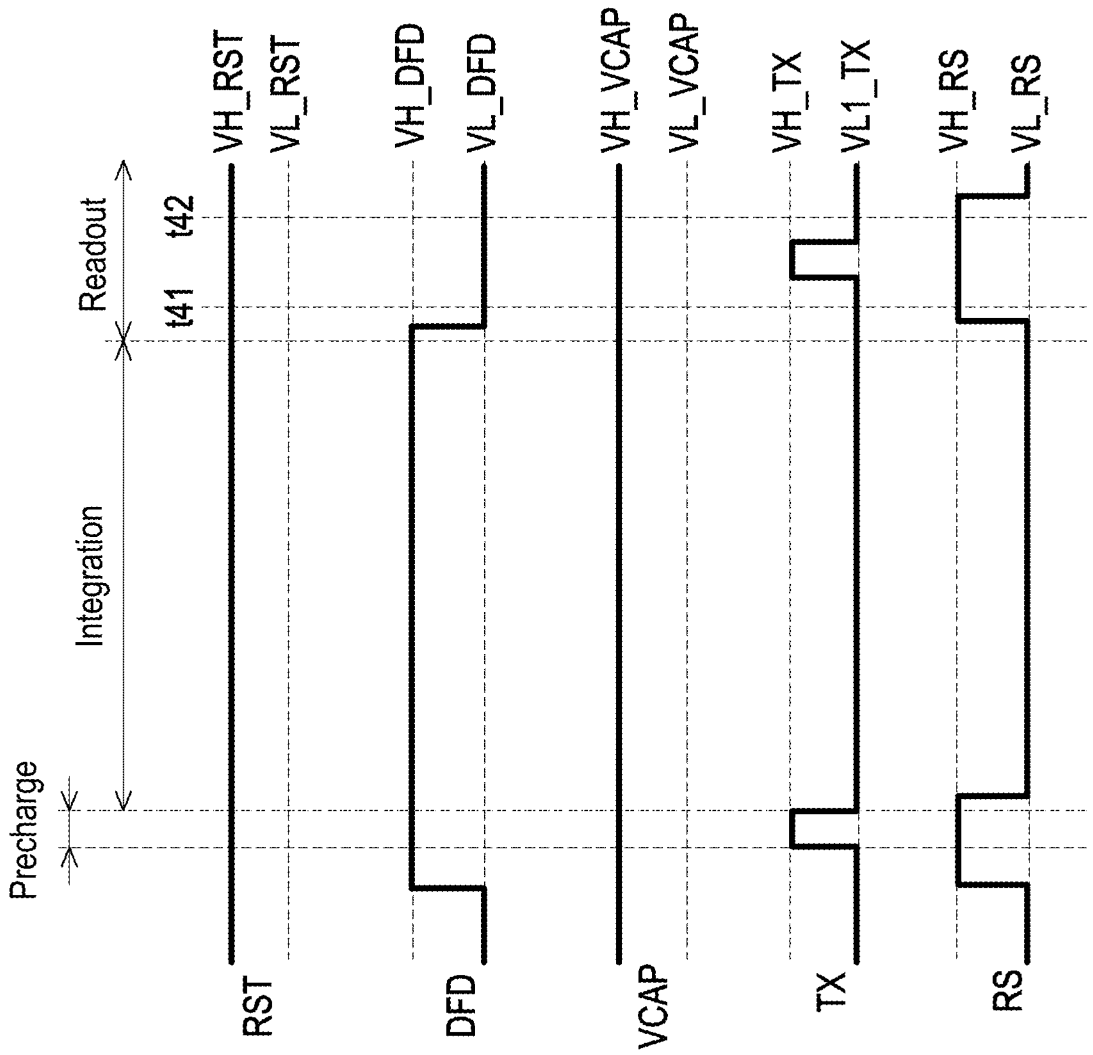
FIG. 4 is a timing diagram illustrating the reset signal, dual floating diffusion signal, floating diffusion capacitor signal, control voltage, and row select signal when the pixel circuit operates in the low illumination sensing mode, according to an embodiment of the disclosure.

FIG. 4 is a timing diagram illustrating the reset signal RST, the dual floating diffusion signal DFD, the floating diffusion capacitor signal VCAP, the control voltage TX, and the row select signal RS when the pixel circuit 200 operates in the low illumination sensing mode, according to an embodiment of the disclosure. The horizontal axis in FIG. 4 represents time. The signal timing shown in FIG. 4 may serve as one of many examples for the reset signal RST, the dual floating diffusion signal DFD, the floating diffusion capacitor signal VCAP, the control voltage TX, and the row select signal RS illustrated in FIG. 2. In the embodiment shown in FIG. 4, the swing of the reset signal RST is from high level VH_RST to low level VL_RST, the swing of the dual floating diffusion signal DFD is from high level VH_DFD to low level VL_DFD, the swing of the floating diffusion capacitor signal VCAP is from high level VH_VCAP to low level VL_VCAP, the swing of the control voltage TX is from high level VH_TX to low level VL1_TX, and the swing of the row select signal RS is from high level VH_RS to low level VL_RS. These levels VH_RST, VL_RST, VH_DFD, VL_DFD, VH_VCAP, VL_VCAP, VH_TX, VL1_TX, VH_RS, and VL_RS may be defined according to the actual design and application. For example, the level VH_TX may be 2.8 V (volts), and the level VL1_TX may be −1.4 V (but not limited thereto).

Referring to FIG. 2 and FIG. 4, the control circuit 110 performs a precharge operation on the pixel circuit 200, that is, pulling up the reset signal RST, the dual floating diffusion signal DFD, the floating diffusion capacitor signal VCAP, and the control voltage TX, to reset the photodiode PD21, the floating diffusion portion FD21, and the LOFIC LOFIC21. In response to the pixel circuit 200 operating in the low illumination sensing mode, the control circuit 110 keeps resetting the floating diffusion portion FD21 and the LOFIC LOFIC21 during the integration period after the precharge operation, that is, continuously pulling up the reset signal RST, the dual floating diffusion signal DFD, and the floating diffusion capacitor signal VCAP, but pulls down the control voltage TX to the level VL1_TX and pulls down the row select signal RS to the level VL_RS. In the low illumination sensing mode, the control voltage TX at the lower level VL1_TX (for example, −1.4 V) is applied to the control terminal of the transfer transistor M_TX21 during the integration period to suppress the dark current at the Si surface under the transfer transistor M_TX21. Further, the lower level VL1_TX can maintain a higher overflow barrier to prevent the full well capacity (FWC) of the photodiode PD21 from dropping.

In response to the pixel circuit 200 operating in the low illumination sensing mode, the control circuit 110 selectively switches the control voltage TX to one of the level VL1_TX and the level VH_TX during the readout period after the integration period. The control voltage TX at the level VH_TX may turn on the transfer transistor M_TX21. The readout circuit 130 reads out the original charge value of the floating diffusion portion FD21 through the readout line RL2 and the source follower circuit SF2 at time point t41 (before the transfer transistor M_TX21 is turned on). After the transfer transistor M_TX21 is turned on, the transfer transistor M_TX21 transfers the photosensitive charges of the photodiode PD21 to the floating diffusion portion FD21. The readout circuit 130 reads out the photosensitive charges of the floating diffusion portion FD21 through the readout line RL2 and the source follower circuit SF2 at time point t42 (the transfer transistor M_TX21 is turned off again after being turned on). The difference between the photosensitive charge value read out at time point t42 and the original charge value read out at time point t41 serves as the HCG sensing result. Therefore, the pixel circuit 200 operating in the low illumination sensing mode can realize a correlated double sampling (CDS) function. The HCG sensing result may serve as the low illumination sensing result (applicable to low illumination incident light).

Referring to FIG. 1, FIG. 2, and FIG. 3, in response to the pixel circuit 200 operating in the high illumination sensing mode, the control circuit 110 applies the control voltage TX at a second level to the control terminal of the transfer transistor M_TX21 during the integration period to turn off the transfer transistor M_TX21 (step S340). The second level may be defined according to the actual design and application, and the second level is higher than the first level in step S330. For example, the second level may be a negative voltage level.

Figure 5:
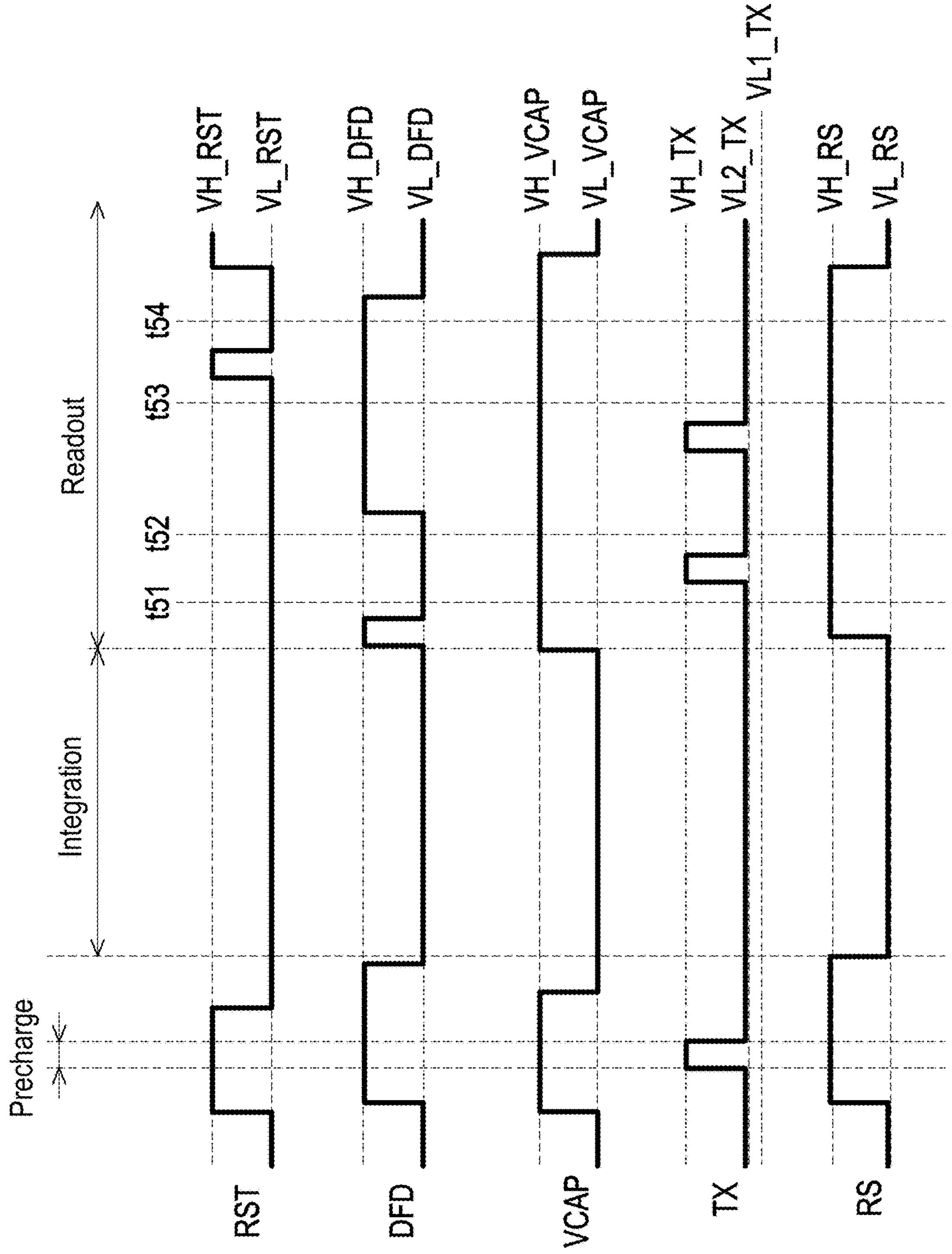
FIG. 5 is a timing diagram illustrating the reset signal, dual floating diffusion signal, floating diffusion capacitor signal, control voltage, and row select signal when the pixel circuit operates in the high illumination sensing mode, according to an embodiment of the disclosure.

FIG. 5 is a timing diagram illustrating the reset signal RST, the dual floating diffusion signal DFD, the floating diffusion capacitor signal VCAP, the control voltage TX, and the row select signal RS when the pixel circuit 200 operates in the high illumination sensing mode, according to an embodiment of the disclosure. The horizontal axis in FIG. 5 represents time. The signal timing shown in FIG. 5 may serve as one of many examples for the reset signal RST, the dual floating diffusion signal DFD, the floating diffusion capacitor signal VCAP, the control voltage TX, and the row select signal RS illustrated in FIG. 2. In the embodiment shown in FIG. 5, the swing of the reset signal RST is from high level VH_RST to low level VL_RST, the swing of the dual floating diffusion signal DFD is from high level VH_DFD to low level VL_DFD, the swing of the floating diffusion capacitor signal VCAP is from high level VH_VCAP to low level VL_VCAP, the swing of the control voltage TX is from high level VH_TX to low level VL2_TX, and the swing of the row select signal RS is from high level VH_RS to low level VL_RS. These levels VH_RST, VL_RST, VH_DFD, VL_DFD, VH_VCAP, VL_VCAP, VH_TX, VL2_TX, VH_RS, and VL_RS may be defined according to the actual design and application. For example, the level VH_TX may be 2.8 V, and the level VL2_TX may be −1.0 V (but not limited thereto). The level VL2_TX is higher than the level VL1_TX shown in FIG. 4.

Referring to FIG. 2 and FIG. 5, the control circuit 110 performs a precharge operation on the pixel circuit 200, that is, pulling up the reset signal RST, the dual floating diffusion signal DFD, the floating diffusion capacitor signal VCAP, and the control voltage TX, to reset the photodiode PD21, the floating diffusion portion FD21, and the LOFIC LOFIC21. In response to the pixel circuit 200 operating in the high illumination sensing mode, the control circuit 110 stops resetting the floating diffusion portion FD21 and the LOFIC LOFIC21 during the integration period after the precharge operation, that is, pulling down the reset signal RST, the dual floating diffusion signal DFD, the floating diffusion capacitor signal VCAP, and the control voltage TX, to enable the floating diffusion portion FD21 and the LOFIC LOFIC21 to store the overflow charges from the photodiode PD21. The control voltage TX is pulled down to the level VL2_TX during the integration period. In the high illumination sensing mode, the control voltage TX at the higher level VL2_TX (for example, −1.0 V, higher than the level VL1_TX shown in FIG. 4) is applied to the control terminal of the transfer transistor M_TX21 during the integration period, to ensure that the overflow charges of the photodiode PD21 overflow through the transfer transistor M_TX21 to the floating diffusion portion FD21 and the LOFIC LOFIC21. Therefore, the image sensor 100 can avoid blooming even when the voltage of the floating diffusion portion FD21 becomes lower due to the overflow charges (signal electrons overflowing from the photodiode PD21).

In response to the pixel circuit 200 operating in the high illumination sensing mode, the control circuit 110 selectively switches the control voltage TX to one of the level VL2_TX and the level VH_TX during the readout period after the integration period. The control voltage TX at the level VH_TX may turn on the transfer transistor M_TX21. The readout circuit 130 reads out the overflow charge value of the floating diffusion portion FD21 through the readout line RL2 and the source follower circuit SF2 at time point t51 (before the transfer transistor M_TX21 and the dual floating diffusion transistor M_DFD21 are turned on). After the transfer transistor M_TX21 is turned on and before the dual floating diffusion transistor M_DFD21 is turned on, the transfer transistor M_TX21 transfers the photosensitive charges of the photodiode PD21 to the floating diffusion portion FD21. The readout circuit 130 reads out the photosensitive charges of the floating diffusion portion FD21 through the readout line RL2 and the source follower circuit SF2 at time point t52 (after the transfer transistor M_TX21 is turned off again and before the dual floating diffusion transistor M_DFD21 is turned on). The difference between the photosensitive charge value read out at time point t52 and the overflow charge value read out at time point t51 serves as the HCG sensing result. Therefore, the pixel circuit 200 operating in the high illumination sensing mode can realize the CDS function. The HCG sensing result may serve as the low illumination sensing result (applicable to low illumination incident light).

After the dual floating diffusion transistor M_DFD21 is turned on and after the transfer transistor M_TX21 is turned on again, the transfer transistor M_TX21 transfers the photosensitive charges of the photodiode PD21 to the floating diffusion portion FD21 and the LOFIC LOFIC21. The readout circuit 130 reads out the photosensitive charge value of the floating diffusion portion FD21 and the LOFIC LOFIC21 through the readout line RL2 and the source follower circuit SF2 at time point t53. After the reset transistor M_RST21 is turned on, the photodiode PD21, the floating diffusion portion FD21, and the LOFIC LOFIC21 are all reset. The readout circuit 130 reads out the reset charge value of the floating diffusion portion FD21 and the LOFIC LOFIC21 through the readout line RL2 and the source follower circuit SF2 at time point t54 (after the reset transistor M_RST21 is turned off). The difference between the photosensitive charge value read out at time point t53 and the reset charge value read out at time point t54 serves as the low conversion gain (LCG) sensing result. The LCG sensing result may serve as the high illumination sensing result (applicable to high illumination incident light).

The pixel circuit 200 operating in the high illumination sensing mode may generate HCG sensing results and LCG sensing results. Therefore, the image sensor 100 can realize the HDR function.

In summary, each pixel circuit (for example, pixel circuit 200) of the image sensor 100 selectively operates in one of the low illumination sensing mode and the high illumination sensing mode to realize the HDR function. When the pixel circuit 200 operates in the low illumination sensing mode, the control terminal of the transfer transistor M_TX21 is applied with the control voltage TX at the first level (for example, level VL1_TX) during the integration period, so that the photodiode PD21 has an appropriate full well capacity (FWC). In response to the pixel circuit 200 operating in the low illumination sensing mode, the floating diffusion portion FD21 is continuously reset during the integration period. In response to the pixel circuit 200 operating in the high illumination sensing mode, the floating diffusion portion FD21 stops being reset during the integration period to store the overflow charges from the photodiode PD21. The overflow charges may lower the voltage of the floating diffusion portion FD21. However, when the voltage of the floating diffusion portion FD21 becomes lower, the overflow barrier under the transfer transistor M_TX21 becomes higher (that is, it becomes more difficult for the overflow charges of the photodiode PD21 to pass through the transfer transistor M_TX21 to the floating diffusion portion FD21), which increases the risk of blooming effect (that is, the photosensitive charges of the photodiode PD21 overflow to adjacent pixels). To reduce the risk, when the pixel circuit 200 operates in the high illumination sensing mode, the control terminal of the transfer transistor M_TX21 is applied with the control voltage TX at the higher second level (for example, level VL2_TX, and the level VL2_TX is higher than the level VL1_TX) during the integration period to turn off the transfer transistor M_TX21. The higher control voltage TX ensures that the overflow charges of the photodiode PD21 overflow through the transfer transistor M_TX21 to the floating diffusion portion FD21, to reduce the risk of blooming. Therefore, the image sensor 100 achieves blooming suppression.

Figure 6:
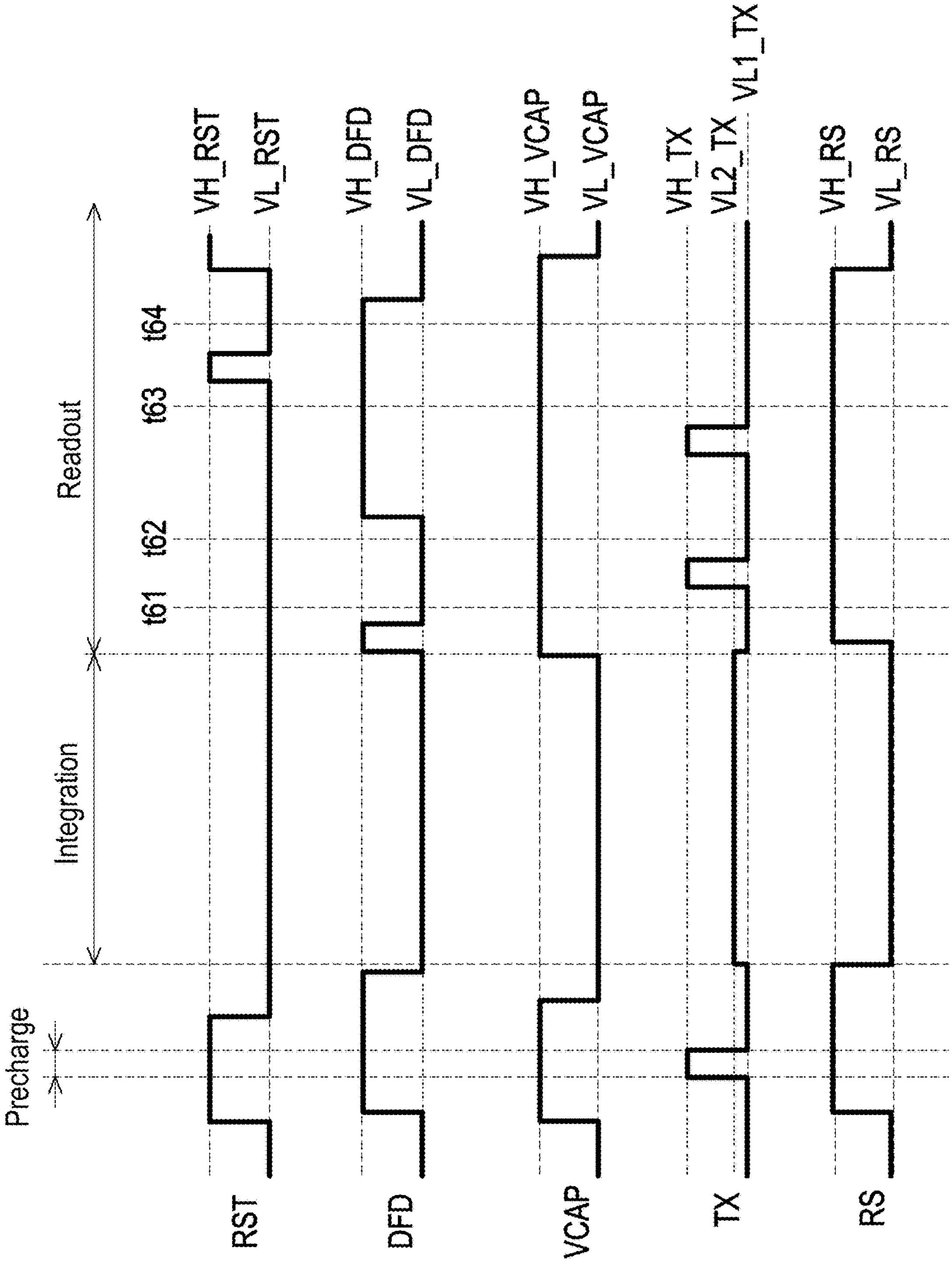
FIG. 6 is a timing diagram illustrating the reset signal, dual floating diffusion signal, floating diffusion capacitor signal, control voltage, and row select signal when the pixel circuit operates in the high illumination sensing mode, according to another embodiment of the disclosure.

FIG. 6 is a timing diagram illustrating the reset signal RST, the dual floating diffusion signal DFD, the floating diffusion capacitor signal VCAP, the control voltage TX, and the row select signal RS when the pixel circuit 200 operates in the high illumination sensing mode, according to another embodiment of the disclosure. The horizontal axis in FIG. 6 represents time. The signal timing shown in FIG. 6 may serve as one of many examples for the reset signal RST, the dual floating diffusion signal DFD, the floating diffusion capacitor signal VCAP, the control voltage TX, and the row select signal RS illustrated in FIG. 2. Details of the reset signal RST, the dual floating diffusion signal DFD, the floating diffusion capacitor signal VCAP, the control voltage TX, and the row select signal RS shown in FIG. 6, as well as the levels VH_RST, VL_RST, VH_DFD, VL_DFD, VH_VCAP, VL_VCAP, VH_TX, VL2_TX, VL1_TX, VH_RS, and VL_RS shown in FIG. 6, may be found in the description of FIG. 5. Details of time points t61, t62, t63, and t64 shown in FIG. 6 may be found in the descriptions of time points t51 to t54 shown in FIG. 5, and therefore will not be repeated here. The difference from the embodiment shown in FIG. 5 lies in the voltage level of the control voltage TX shown in FIG. 6.

Referring to FIG. 2 and FIG. 6, in response to the pixel circuit 200 operating in the high illumination sensing mode, the control circuit 110 pulls down the control voltage TX from the level VH_TX to the level VL1_TX (the level VL1_TX is lower than the level VL2_TX) after completing resetting the photodiode PD21, the floating diffusion portion FD21, and the LOFIC LOFIC21. During the integration period, the control circuit 110 pulls up the control voltage TX from the level VL1_TX to the level VL2_TX. When the integration period ends, the control circuit 110 pulls down the control voltage TX from the level VL2_TX to the level VL1_TX. During the readout period following the integration period, the control circuit 110 selectively switches the control voltage TX to one of the level VL1_TX and the level VH_TX.

The swing of the control voltage TX from low level to high level is lower, resulting in a lower voltage of the floating diffusion portion FD21 during charge transfer (the control voltage TX changes the voltage of the floating diffusion portion FD21 through coupling effect), which may lead to a lag issue. Compared to the embodiment shown in FIG. 5, the embodiment shown in FIG. 6 only applies the higher level VL2_TX during the integration period, and applies the lower level VL1_TX during the readout period. The control voltage TX shown in FIG. 6 has a larger swing (from the level VL1_TX to the level VH_TX) during the readout period, thus avoiding the lag issue. A larger swing of the control voltage TX can accelerate the transfer operation of the transfer transistor M_TX21 for the photosensitive charges of the photodiode PD21 during the readout period.

Figure 7:
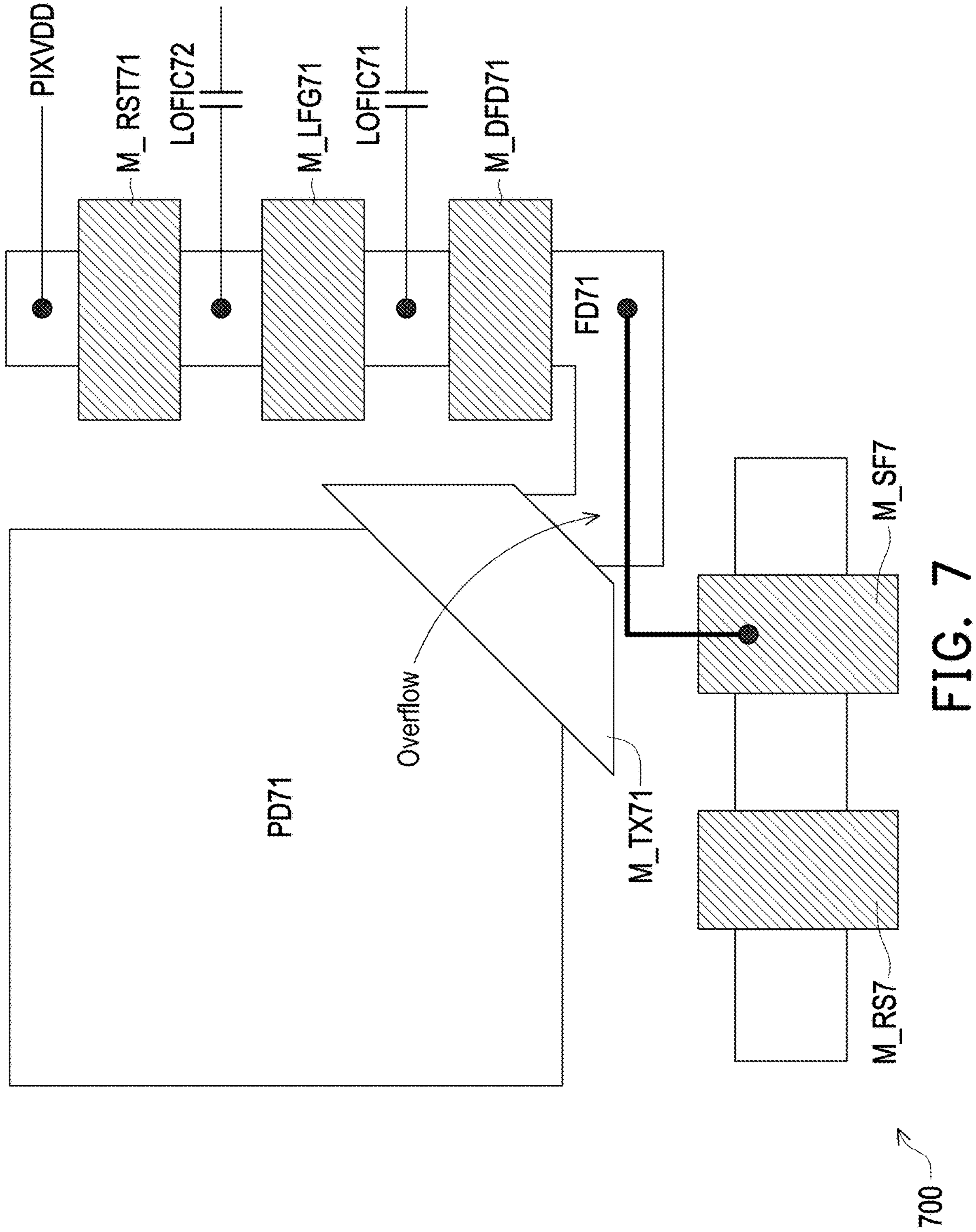
FIG. 7 is a layout diagram illustrating a pixel circuit according to another embodiment of the disclosure.

FIG. 7 is a layout diagram illustrating a pixel circuit 700 according to another embodiment of the disclosure. The pixel circuit 700 shown in FIG. 7 may serve as one of many exemplary embodiments of the pixel circuits P11 to Pmn shown in FIG. 1. For details of the pixel circuit 700 shown in FIG. 7, please refer to the above descriptions of the pixel circuits P11 to Pmn shown in FIG. 1. In the embodiment shown in FIG. 7, the pixel circuit 700 includes a photosensitive element (for example, a photodiode PD71 or other photosensitive elements), a floating diffusion portion FD71, a transfer transistor M_TX71, a source follower transistor M_SF7, a row select transistor M_RS7, a dual floating diffusion (DFD) transistor M_DFD71, a switch transistor M_LFG71, a first capacitor (for example, LOFIC LOFIC71), a second capacitor (for example, LOFIC LOFIC72), and a reset transistor M_RST71.

Details of the pixel circuit 700, the photodiode PD71, the floating diffusion portion FD71, the transfer transistor M_TX71, the source follower transistor M_SF7, the row select transistor M_RS7, the dual floating diffusion transistor M_DFD71, the LOFIC LOFIC71, and the reset transistor M_RST71 shown in FIG. 7 may be found in the descriptions of the pixel circuit 200, the photodiode PD21, the floating diffusion portion FD21, the transfer transistor M_TX21, the source follower transistor M_SF2, the row select transistor M_RS2, the dual floating diffusion transistor M_DFD21, the LOFIC LOFIC21, and the reset transistor M_RST21 shown in FIG. 2, and therefore will not be repeated here. The first terminal of the switch transistor M_LFG71 is coupled to the second terminal of the dual floating diffusion transistor M_DFD71. The first terminal of the LOFIC LOFIC72 is coupled to the second terminal of the switch transistor M_LFG71. The capacity of the LOFIC LOFIC71 is greater than the capacity of the floating diffusion portion FD71, and the capacity of the LOFIC LOFIC72 is greater than the capacity of the LOFIC LOFIC71. The LOFIC LOFIC71 includes a MOM capacitor, a MOS capacitor, or other capacitor components, and the LOFIC LOFIC72 includes a 3D MIM capacitor, a MOS capacitor, or other capacitor components. The reset transistor M_RST71 of the reset circuit 210 is coupled to the second terminal of the switch transistor M_LFG71. The reset transistor M_RST71 is controlled by the control circuit 110 to selectively reset the pixel circuit 700.

In response to the pixel circuit 700 operating in the low illumination sensing mode, the control circuit 110 applies the control voltage TX at the first level (for example, the level VL1_TX shown in FIG. 4) to the control terminal of the transfer transistor M_TX71 during the integration period to turn off the transfer transistor M_TX71 (step S330). In response to the pixel circuit 700 operating in the high illumination sensing mode, the control circuit 110 applies the control voltage TX at the second level (for example, the level VL2_TX shown in FIG. 5 or FIG. 6) to the control terminal of the transfer transistor M_TX71 during the integration period to turn off the transfer transistor M_TX71 (step S340). The control voltage TX is pulled down to the level VL2_TX during the integration period to enable the floating diffusion portion FD71, the LOFIC LOFIC71, and the LOFIC LOFIC72 to store the overflow charges from the photodiode PD71.

Figure 8:
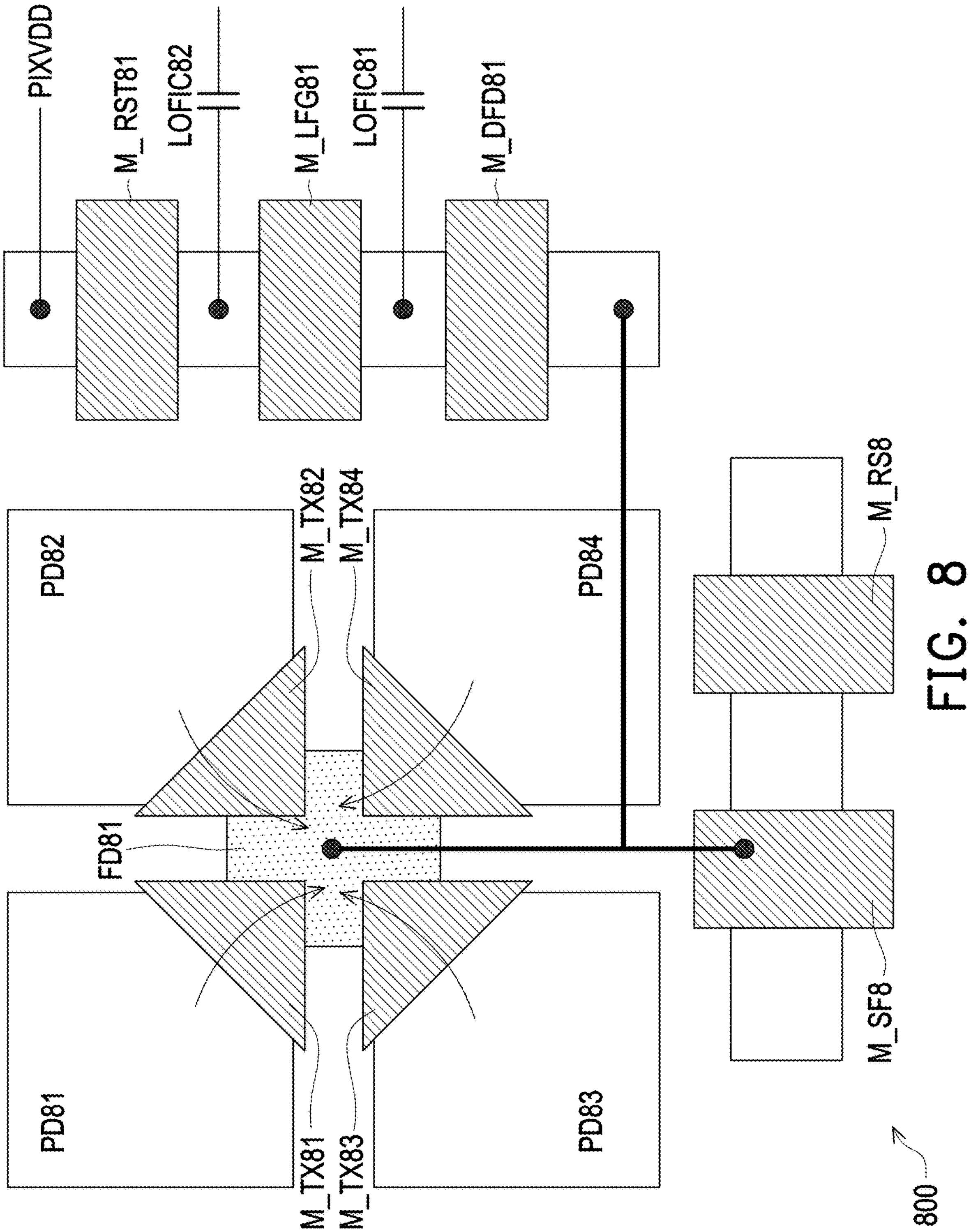
FIG. 8 is a layout diagram illustrating a pixel circuit according to yet another embodiment of the disclosure.

FIG. 8 is a layout diagram illustrating a pixel circuit 800 according to yet another embodiment of the disclosure. The pixel circuit 800 shown in FIG. 8 may serve as one of many exemplary embodiments of the pixel circuits P11 to Pmn shown in FIG. 1. For details of the pixel circuit 800 shown in FIG. 8, please refer to the above descriptions of the pixel circuits P11 to Pmn shown in FIG. 1. In the embodiment shown in FIG. 8, the pixel circuit 800 includes multiple photosensitive elements (for example, photodiodes PD81, PD82, PD83, and PD84), multiple transfer transistors (for example, transfer transistors M_TX81, M_TX82, M_TX83, and M_TX84), a floating diffusion portion FD81, a source follower transistor M_SF8, a row select transistor M_RS8, a dual floating diffusion transistor M_DFD81, a switch transistor M_LFG81, a first capacitor (for example, LOFIC LOFIC81), a second capacitor (for example, LOFIC LOFIC82), and a reset transistor M_RST81.

Details of the pixel circuit 800, the photodiodes PD81 to PD84, the transfer transistors M_TX81 to M_TX84, the floating diffusion portion FD81, the source follower transistor M_SF8, the row select transistor M_RS8, the dual floating diffusion transistor M_DFD81, the LOFIC LOFIC81, and the reset transistor M_RST81 shown in FIG. 8 may be found in the descriptions of the pixel circuit 200, the photodiode PD21, the transfer transistor M_TX21, the floating diffusion portion FD21, the source follower transistor M_SF2, the row select transistor M_RS2, the dual floating diffusion transistor M_DFD21, the LOFIC LOFIC21, and the reset transistor M_RST21 shown in FIG. 2. Details of the floating diffusion portion FD81, the source follower transistor M_SF8, the row select transistor M_RS8, the dual floating diffusion transistor M_DFD81, the switch transistor M_LFG81, the LOFIC LOFIC81, the LOFIC LOFIC82, and the reset transistor M_RST81 shown in FIG. 8 may be found in the descriptions of the floating diffusion portion FD71, the source follower transistor M_SF7, the row select transistor M_RS7, the dual floating diffusion transistor M_DFD71, the switch transistor M_LFG71, the LOFIC LOFIC71, the LOFIC LOFIC72, and the reset transistor M_RST71 shown in FIG. 7, and therefore will not be repeated here. The transfer transistor M_TX81 is coupled between the photodiode PD81 and the floating diffusion portion FD81. The transfer transistor M_TX82 is coupled between the photodiode PD82 and the floating diffusion portion FD81. The transfer transistor M_TX83 is coupled between the photodiode PD83 and the floating diffusion portion FD81. The transfer transistor M_TX84 is coupled between the photodiode PD84 and the floating diffusion portion FD81.

In response to the pixel circuit 800 operating in the low illumination sensing mode, the control circuit 110 applies the control voltage TX at the first level (for example, the level VL1_TX shown in FIG. 4) to the control terminals of the transfer transistors M_TX81 to M_TX84 during the integration period to turn off the transfer transistors M_TX81 to M_TX84 (step S330). In response to the pixel circuit 800 operating in the high illumination sensing mode, the control circuit 110 applies the control voltage TX at the second level (for example, the level VL2_TX shown in FIG. 5 or FIG. 6) to the control terminals of the transfer transistors M_TX81 to M_TX84 during the integration period to turn off the transfer transistors M_TX81 to M_TX84 (step S340). The control voltage TX is pulled down to the level VL2_TX during the integration period to enable the floating diffusion portion FD81, the LOFIC LOFIC81, and the LOFIC LOFIC82 to store the overflow charges from the photodiodes PD81 to PD84.

Figure 9:
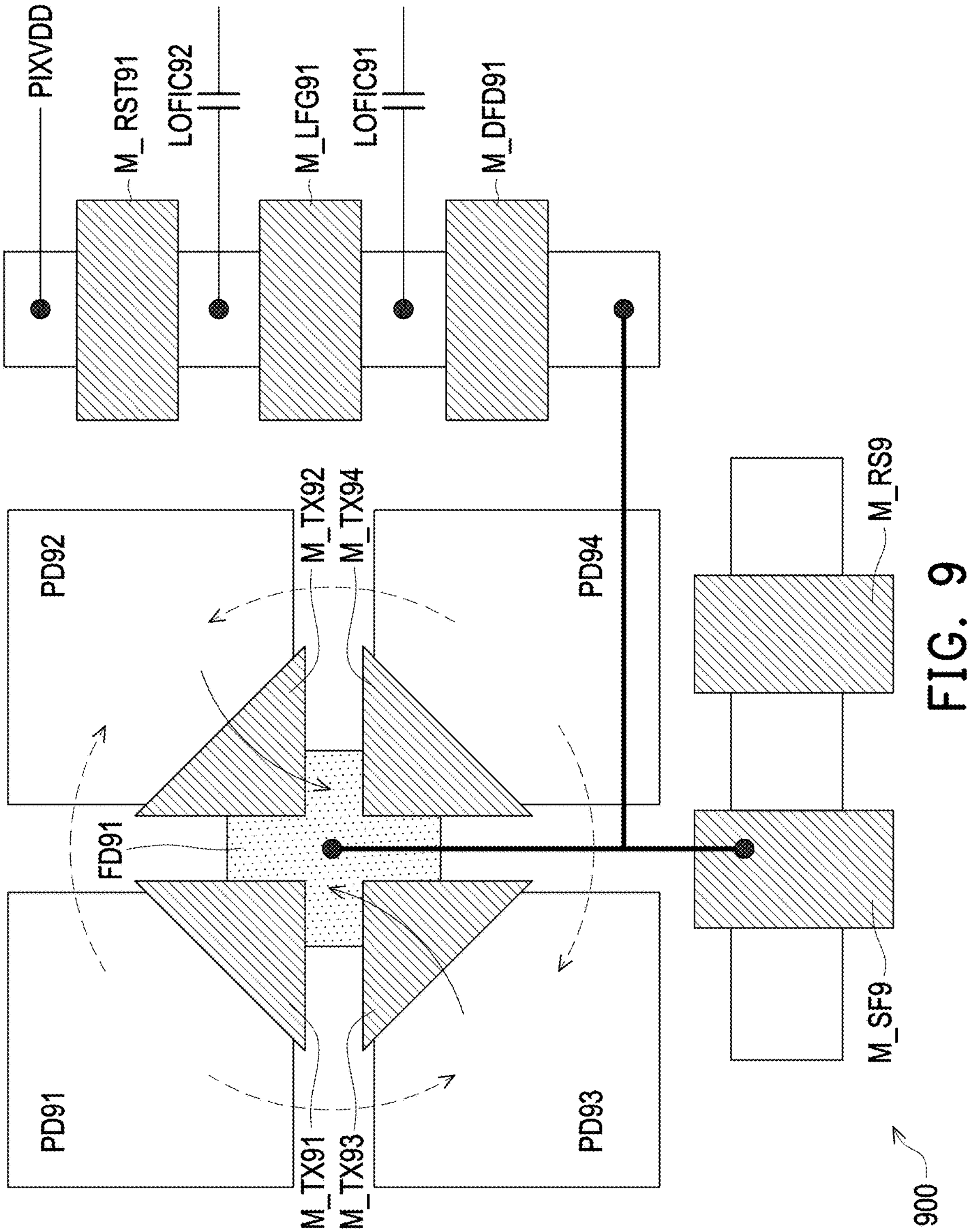
FIG. 9 is a layout diagram illustrating a pixel circuit according to yet another embodiment of the disclosure.

FIG. 9 is a layout diagram illustrating a pixel circuit 900 according to yet another embodiment of the disclosure. The pixel circuit 900 shown in FIG. 9 may serve as one of many exemplary embodiments of the pixel circuits P11 to Pmn shown in FIG. 1. For details of the pixel circuit 900 shown in FIG. 9, please refer to the above descriptions of the pixel circuits P11 to Pmn shown in FIG. 1. In the embodiment shown in FIG. 9, the pixel circuit 900 includes multiple photosensitive elements (for example, photodiodes PD91, PD92, PD93, and PD94), multiple transfer transistors (for example, transfer transistors M_TX91, M_TX92, M_TX93, and M_TX94), a floating diffusion portion FD91, a source follower transistor M_SF9, a row select transistor M_RS9, a dual floating diffusion transistor M_DFD91, a switch transistor M_LFG91, a first capacitor (for example, LOFIC LOFIC91), a second capacitor (for example, LOFIC LOFIC92), and a reset transistor M_RST91.

Details of the pixel circuit 900, the photodiodes PD91 to PD94, the transfer transistors M_TX91 to M_TX94, the floating diffusion portion FD91, the source follower transistor M_SF9, the row select transistor M_RS9, the dual floating diffusion transistor M_DFD91, the LOFIC LOFIC91, and the reset transistor M_RST91 shown in FIG. 9 may be found in the descriptions of the pixel circuit 200, the photodiode PD21, the transfer transistor M_TX21, the floating diffusion portion FD21, the source follower transistor M_SF2, the row select transistor M_RS2, the dual floating diffusion transistor M_DFD21, the LOFIC LOFIC21, and the reset transistor M_RST21 shown in FIG. 2. Details of the floating diffusion portion FD91, the source follower transistor M_SF9, the row select transistor M_RS9, the dual floating diffusion transistor M_DFD91, the switch transistor M_LFG91, the LOFIC LOFIC91, the LOFIC LOFIC92, and the reset transistor M_RST91 shown in FIG. 9 may be found in the descriptions of the floating diffusion portion FD71, the source follower transistor M_SF7, the row select transistor M_RS7, the dual floating diffusion transistor M_DFD71, the switch transistor M_LFG71, the LOFIC LOFIC71, the LOFIC LOFIC72, and the reset transistor M_RST71 shown in FIG. 7. Details of the photodiodes PD91 to PD94 and the transfer transistors M_TX91 to M_TX94 shown in FIG. 9 may be found in the descriptions of the photodiodes PD81 to PD84 and the transfer transistors M_TX81 to M_TX84 shown in FIG. 8, and therefore will not be repeated here.

In response to the pixel circuit 900 operating in the low illumination sensing mode, the control circuit 110 applies the control voltage with the first level (for example, the level VL1_TX shown in FIG. 4) to the control terminals of the transfer transistors M_TX91 to M_TX94 during the integration period to turn off the transfer transistors M_TX91 to M_TX94. In response to the pixel circuit 900 operating in the high illumination sensing mode, the control circuit 110 applies the control voltage with the first level (for example, the level VL1_TX shown in FIG. 4) to the control terminals of the transfer transistors M_TX91 and M_TX94, and the control circuit 110 applies the control voltage with the second level (for example, the level VL2_TX shown in FIG. 5 or FIG. 6) to the control terminals of the transfer transistors M_TX92 and M_TX93 during the integration period (step S340) to turn off the transfer transistors M_TX91 to M_TX94.

Not all the transfer transistors M_TX91 to M_TX94 are applied with the higher level VL2_TX during the integration period (the transfer transistors M_TX92 and M_TX93 are applied with the higher level VL2_TX, while the transfer transistors M_TX91 and M_TX94 are applied with the lower level VL1_TX). The excess photosensitive charges of the photodiodes PD91 and PD94 may overflow to the photodiodes PD92 and PD93, and the excess photosensitive charges of the photodiodes PD92 and PD93 may overflow to the floating diffusion portion FD91 through the transfer transistors M_TX92 and M_TX93. Compared to the embodiment shown in FIG. 8, the operation of this embodiment shown in FIG. 9 allows the image sensor 100 to minimize dark current/white pixel (DC/WP) degradation.

Figure 10:
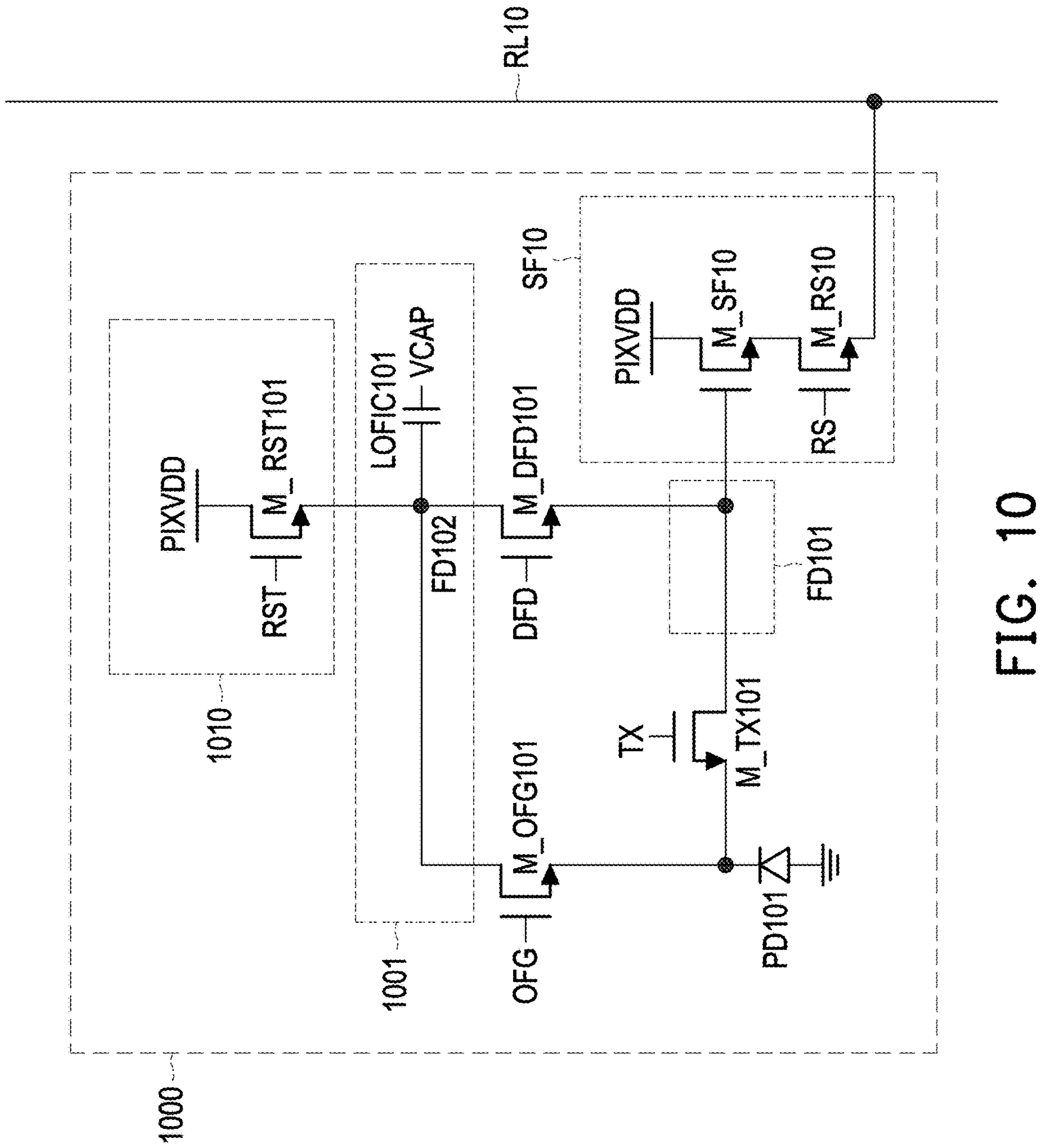
FIG. 10 is a circuit block diagram of a pixel circuit according to another embodiment of the disclosure.

FIG. 10 is a circuit block diagram of a pixel circuit 1000 according to another embodiment of the disclosure. The pixel circuit 1000 and a readout line RL10 shown in FIG. 10 may serve as one of many exemplary embodiments of the pixel circuits P11 to Pmn and the readout lines RL11 to RL1*n* shown in FIG. 1. For details of the pixel circuit 1000 and the readout line RL10 shown in FIG. 10, please refer to the above descriptions of the pixel circuits P11 to Pmn and the readout lines RL11 to RL1*n* shown in FIG. 1. In the embodiment shown in FIG. 10, the pixel circuit 1000 includes a photosensitive element (for example, a photodiode PD101 or other photosensitive elements), a floating diffusion portion FD101, a transfer transistor M_TX101, a source follower circuit SF10, a dual floating diffusion transistor M_DFD101, an overflow transistor M_OFG101, and an overflow storage portion 1001. The photodiode PD101 generates photosensitive charges in response to incident light. The transfer transistor M_TX101 is coupled between the photodiode PD101 and the floating diffusion portion FD101. The dual floating diffusion transistor M_DFD101 is coupled between the floating diffusion portion FD101 and the overflow storage portion 1001. The overflow transistor M_OFG101 is coupled between the photodiode PD101 and the overflow storage portion 1001. In an environment of high illumination, excess photosensitive charges of the photodiode PD101 may overflow to the overflow storage portion 1001 through the overflow transistor M_OFG101.

In the embodiment shown in FIG. 10, the overflow storage portion 1001 includes a capacitor (eg, LOFIC LOFIC101), a reset circuit 1010 includes a reset transistor M_RST101, and the source follower circuit SF10 includes a source follower transistor M_SF10 and a row select transistor M_RS10. Details of the pixel circuit 1000, the photodiode PD101, the floating diffusion portion FD101, the transfer transistor M_TX101, the source follower circuit SF10, the dual floating diffusion transistor M_DFD101, the LOFIC LOFIC101, the reset circuit 1010, the reset transistor M_RST101, the source follower transistor M_SF10 and the row select transistor M_RS10 shown in FIG. 10 may be found in the descriptions of the pixel circuit 200, the photodiode PD21, the floating diffusion portion FD21, the transfer transistor M_TX21, the source follower circuit SF2, the dual floating diffusion transistor M_DFD21, the LOFIC LOFIC21, the reset circuit 210, the reset transistor M_RST21, the source follower transistor M_SF2 and the row select transistor M_RS2 shown in FIG. 2, and therefore will not be repeated here.

In the embodiment shown in FIG. 10, the control terminal (for example, gate) of the overflow transistor M_OFG101 is coupled to the control circuit 110 to receive a control voltage OFG. In response to the control voltage OFG, the overflow transistor M_OFG101 is turned off. A first terminal of the overflow transistor M_OFG101 is coupled to the photodiode PD101. A second terminal of the overflow transistor M_OFG101 is coupled to the LOFIC LOFIC101 of the overflow storage portion 1001.

Figure 11:
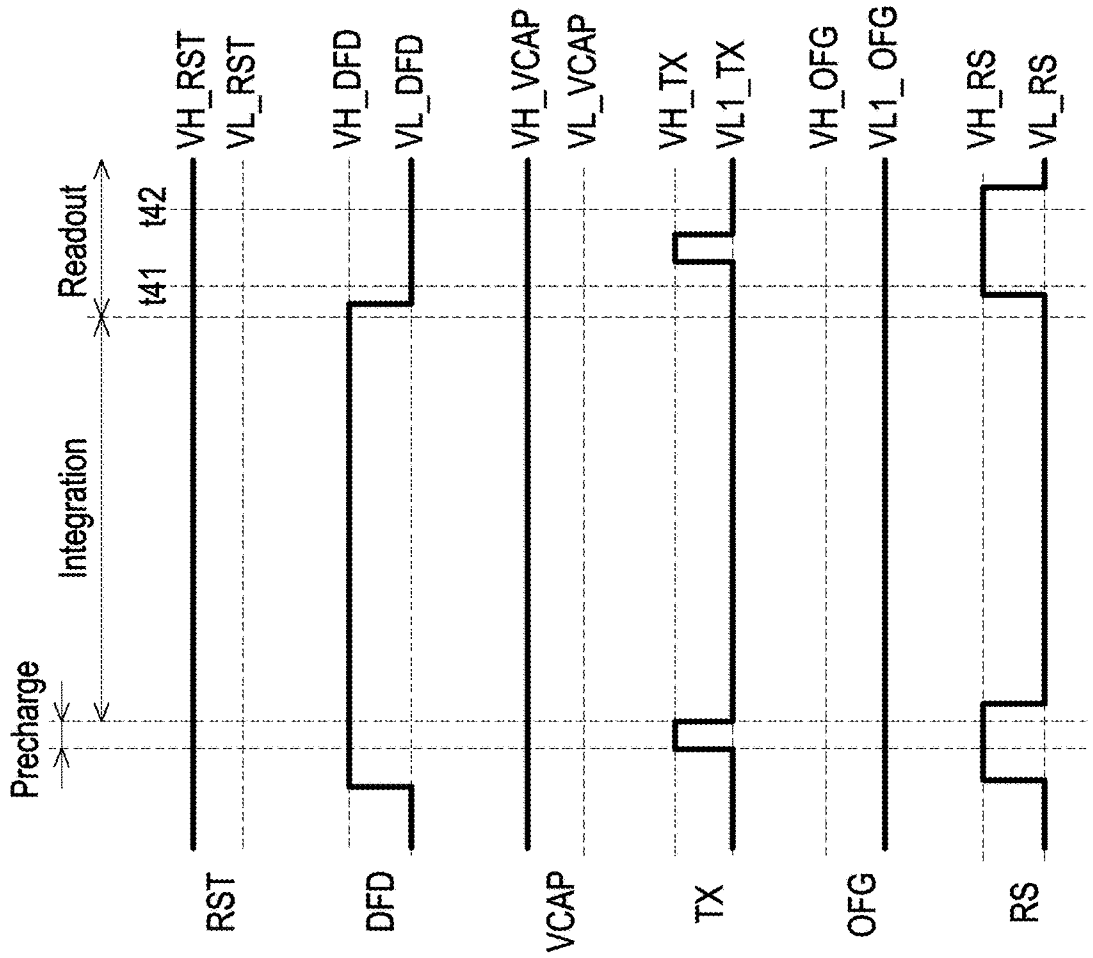
FIG. 11 is a timing diagram illustrating the reset signal, the dual floating diffusion signal, the floating diffusion capacitor signal, the control voltage, and the row select signal when the pixel circuit operates in the low illumination sensing mode, according to an embodiment of the disclosure.

FIG. 11 is a timing diagram illustrating the reset signal RST, the dual floating diffusion signal DFD, the floating diffusion capacitor signal VCAP, the control voltage TX, the control voltage OFG, and the row select signal RS when the pixel circuit 1000 operates in the low illumination sensing mode, according to an embodiment of the disclosure. The horizontal axis in FIG. 11 represents time. The signal timing shown in FIG. 11 may serve as one of many examples for the reset signal RST, the dual floating diffusion signal DFD, the floating diffusion capacitor signal VCAP, the control voltage TX, the control voltage OFG, and the row select signal RS illustrated in FIG. 10. In the embodiment shown in FIG. 11, the swing of the reset signal RST is from high level VH_RST to low level VL_RST, the swing of the dual floating diffusion signal DFD is from high level VH_DFD to low level VL_DFD, the swing of the floating diffusion capacitor signal VCAP is from high level VH_VCAP to low level VL_VCAP, the swing of the control voltage TX is from high level VH_TX to low level VL1_TX, the swing of the control voltage OFG is from high level VH_OFG to low level VL1_OFG, and the swing of the row select signal RS is from high level VH_RS to low level VL_RS. These levels VH_RST, VL_RST, VH_DFD, VL_DFD, VH_VCAP, VL_VCAP, VH_TX, VL1_TX, VH_OFG, VL1_OFG, VH_RS, and VL_RS may be defined according to the actual design and application. For example, the level VH_OFG may be 2.8 V (volts), and the level VL1_OFG may be −1.4 V (but not limited thereto).

Referring to FIG. 10 and FIG. 11, the control circuit 110 performs a precharge operation on the pixel circuit 1000, that is, pulling up the reset signal RST, the dual floating diffusion signal DFD, the floating diffusion capacitor signal VCAP, and the control voltage TX, to reset the photodiode PD101, the floating diffusion portion FD101, and the LOFIC LOFIC101. In response to the pixel circuit 1000 operating in the low illumination sensing mode, the control circuit 110 keeps resetting the floating diffusion portion FD101 and the LOFIC LOFIC101 during the integration period after the precharge operation, that is, continuously pulling up the reset signal RST, the dual floating diffusion signal DFD, and the floating diffusion capacitor signal VCAP, but pulls down the control voltage TX to the level VL1_TX and pulls down the row select signal RS to the level VL_RS. The control voltage OFG is maintained at the level VL1_OFG. In the low illumination sensing mode, the control voltage TX at the lower level VL1_TX (for example, −1.4 V) is applied to the control terminal of the transfer transistor M_TX101 and the control voltage OFG at the lower level VL1_OFG (for example, −1.4 V) is applied to the control terminal of the overflow transistor M_OFG101 during the integration period to suppress the dark current at the Si surface under the transfer transistor M_TX101 and the overflow transistor M_OFG101. Further, the lower level VL1_TX and VL1_OFG can maintain a higher overflow barrier to prevent the full well capacity (FWC) of the photodiode PD101 from dropping. The signal timing shown in FIG. 11 can be referred to the relevant description of FIG. 4, so no further description is given.

Referring to FIG. 1, and FIG. 10, in response to the pixel circuit 1000 operating in the high illumination sensing mode, the control circuit 110 applies the control voltage OFG at a second level to the control terminal of the overflow transistor M_OFG101 during the integration period to turn off the overflow transistor M_OFG101. The second level may be defined according to the actual design and application, and the second level is higher than the first level. For example, the second level may be a negative voltage level.

Figure 12:
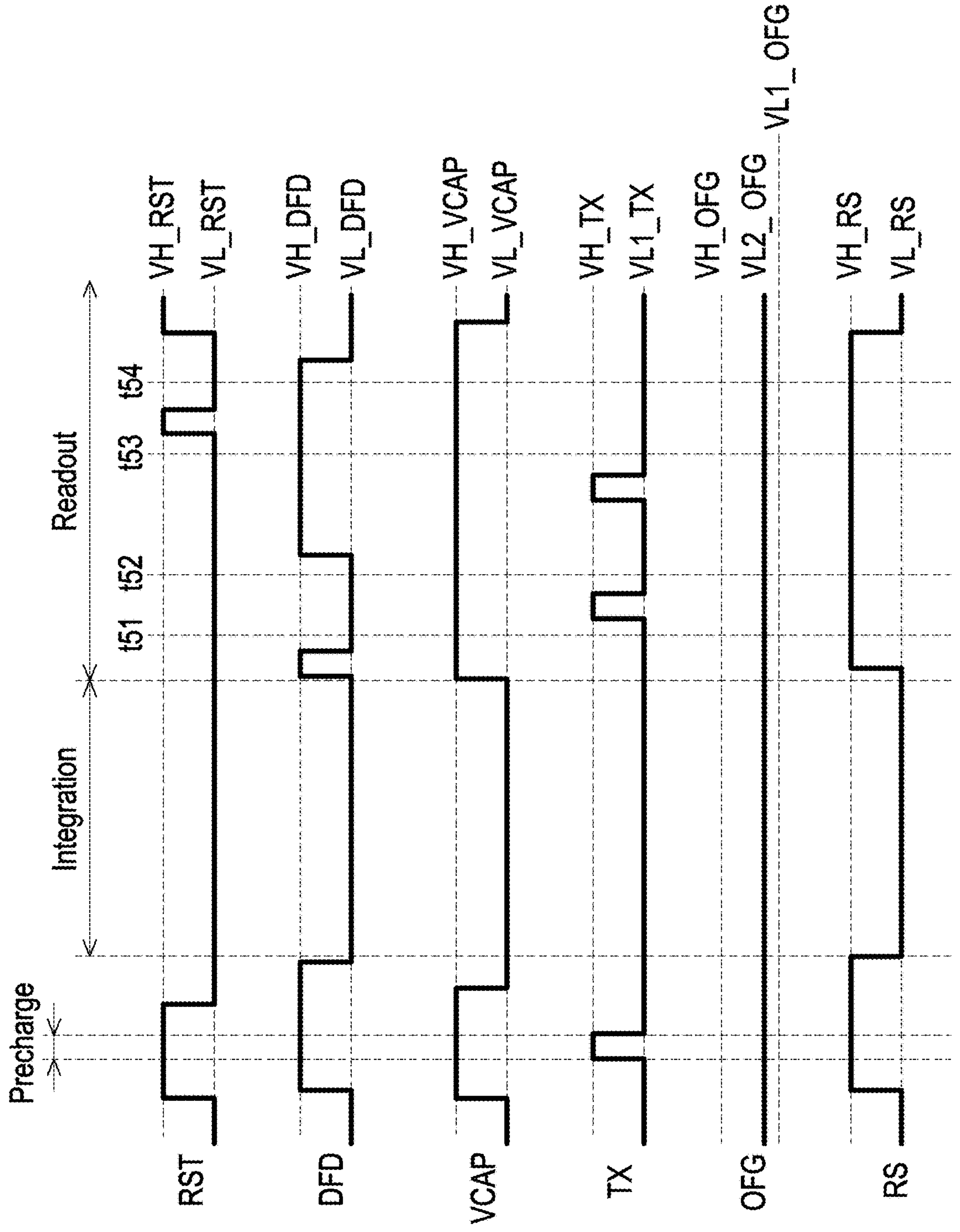
FIG. 12 is a timing diagram illustrating the reset signal, the dual floating diffusion signal, the floating diffusion capacitor signal, the transfer signal, the control voltage, and the row select signal when the pixel circuit operates in the high illumination sensing mode, according to an embodiment of the disclosure.

FIG. 12 is a timing diagram illustrating the reset signal RST, the dual floating diffusion signal DFD, the floating diffusion capacitor signal VCAP, the control voltage TX, the control voltage OFG, and the row select signal RS when the pixel circuit 1000 operates in the high illumination sensing mode, according to an embodiment of the disclosure. The horizontal axis in FIG. 12 represents time. The signal timing shown in FIG. 12 may serve as one of many examples for the reset signal RST, the dual floating diffusion signal DFD, the floating diffusion capacitor signal VCAP, the control voltage TX, the control voltage OFG, and the row select signal RS illustrated in FIG. 10. In the embodiment shown in FIG. 12, the swing of the reset signal RST is from high level VH_RST to low level VL_RST, the swing of the dual floating diffusion signal DFD is from high level VH_DFD to low level VL_DFD, the swing of the floating diffusion capacitor signal VCAP is from high level VH_VCAP to low level VL_VCAP, the swing of the control voltage TX is from high level VH_TX to low level VL1_TX, the swing of the control voltage OFG is from high level VH_OFG to low level VL2_OFG, and the swing of the row select signal RS is from high level VH_RS to low level VL_RS. These levels VH_RST, VL_RST, VH_DFD, VL_DFD, VH_VCAP, VL_VCAP, VH_TX, VL1_TX, VH_OFG, VL2_OFG, VH_RS, and VL_RS may be defined according to the actual design and application. For example, the level VH_OFG may be 2.8 V, and the level VL2_OFG may be −1.0 V (but not limited thereto). The level VL2_OFG is higher than the level VL1_OFG shown in FIG. 11.

Referring to FIG. 10 and FIG. 12, the control circuit 110 performs a precharge operation on the pixel circuit 1000, that is, pulling up the reset signal RST, the dual floating diffusion signal DFD, the floating diffusion capacitor signal VCAP, and the control voltage TX, to reset the photodiode PD101, the floating diffusion portion FD101, and the LOFIC LOFIC101. In response to the pixel circuit 1000 operating in the high illumination sensing mode, the control circuit 110 stops resetting the LOFIC LOFIC101 during the integration period after the precharge operation, that is, pulling down the reset signal RST, the dual floating diffusion signal DFD, the floating diffusion capacitor signal VCAP, and the control voltage TX, to enable the LOFIC LOFIC101 to store the overflow charges from the photodiode PD101. The control voltage OFG is maintained at the level VL2_OFG. In the high illumination sensing mode, the control voltage OFG at the higher level VL2_OFG (for example, −1.0 V, higher than the level VL1_OFG shown in FIG. 11) is applied to the control terminal of the overflow transistor M_OFG101 during the integration period, to ensure that the overflow charges of the photodiode PD101 overflow through the overflow transistor M_OFG101 to the LOFIC LOFIC101. Therefore, the image sensor 100 can avoid blooming. The signal timing shown in FIG. 12 can be referred to the relevant description of FIG. 5, so no further description is given.

In summary, the pixel circuit 1000 selectively operates in one of the low illumination sensing mode and the high illumination sensing mode to realize the HDR function. When the pixel circuit 1000 operates in the low illumination sensing mode, the control terminal of the overflow transistor M_OFG101 is applied with the control voltage OFG at the first level (for example, level VL1_OFG) during the integration period, so that the photodiode PD101 has an appropriate full well capacity (FWC). In response to the pixel circuit 1000 operating in the low illumination sensing mode, the floating diffusion portion FD101 and the LOFIC LOFIC101 are continuously reset during the integration period. In response to the pixel circuit 1000 operating in the high illumination sensing mode, the LOFIC LOFIC101 stop being reset during the integration period to store the overflow charges from the photodiode PD101. The overflow charges may lower the voltages of a floating diffusion node FD102. However, when the voltages of the floating diffusion node FD102 becomes lower, the overflow barrier under the overflow transistor M_OFG101 becomes higher (that is, it becomes more difficult for the overflow charges of the photodiode PD101 to pass through the overflow transistor M_OFG101 to the floating diffusion node FD102), which increases the risk of blooming effect. To reduce the risk, when the pixel circuit 1000 operates in the high illumination sensing mode, the control terminal of the overflow transistor M_OFG101 is applied with the control voltage OFG at the higher second level (for example, level VL2_OFG, and the level VL2_OFG is higher than the level VL1_OFG) during the integration period to turn off the overflow transistor M_OFG101. The higher control voltage OFG ensures that the overflow charges of the photodiode PD101 overflow through the overflow transistor M_OFG101 to the LOFIC LOFIC101, to reduce the risk of blooming. Therefore, the pixel circuit 1000 achieves blooming suppression.

Figure 13:
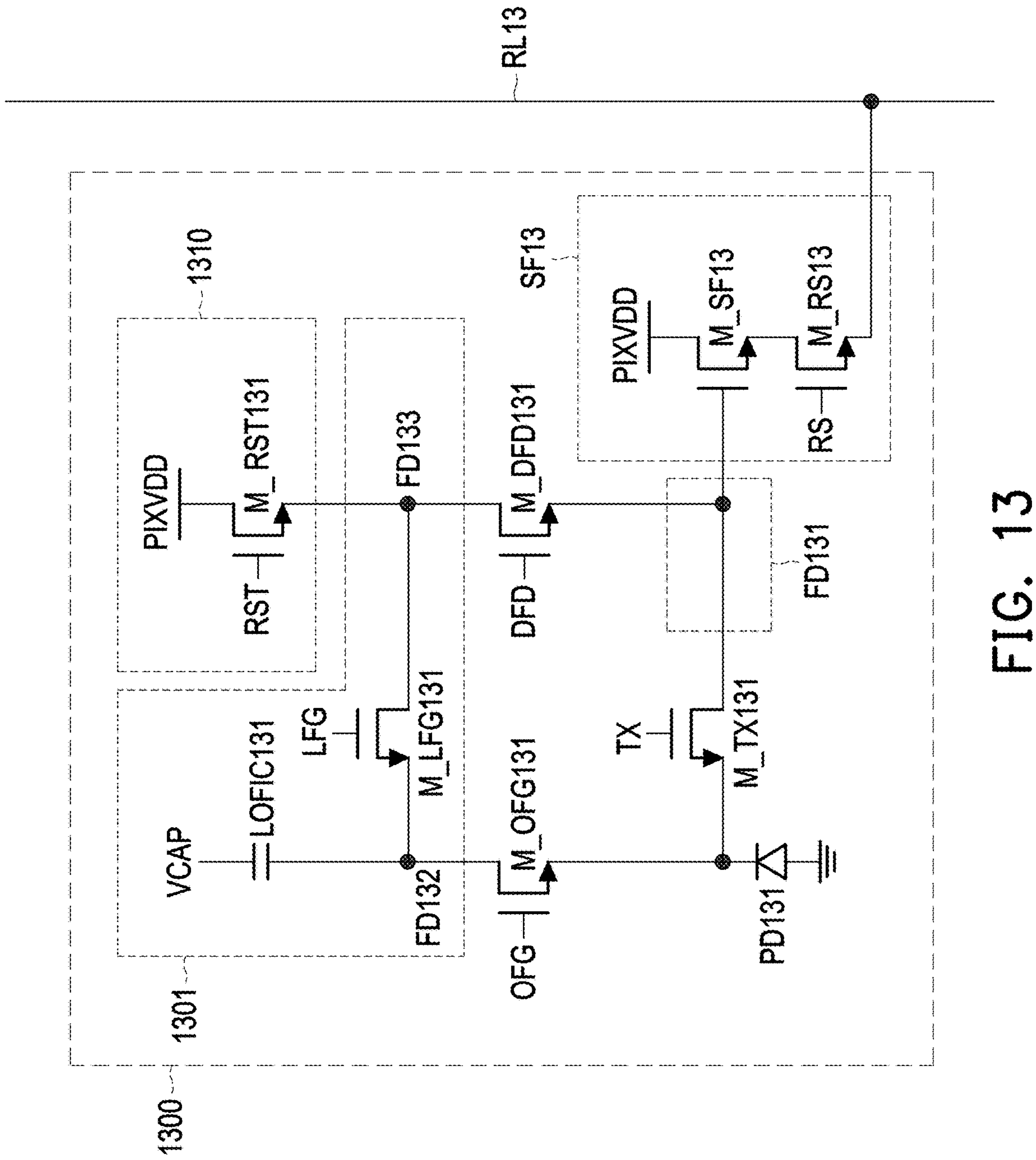
FIG. 13 is a circuit block diagram of a pixel circuit according to another embodiment of the disclosure.

FIG. 13 is a circuit block diagram of a pixel circuit 1300 according to another embodiment of the disclosure. The pixel circuit 1300 and a readout line RL13 shown in FIG. 13 may serve as one of many exemplary embodiments of the pixel circuits P11 to Pmn and the readout lines RL11 to RL1*n* shown in FIG. 1. For details of the pixel circuit 1300 and the readout line RL13 shown in FIG. 13, please refer to the above descriptions of the pixel circuits P11 to Pmn and the readout lines RL11 to RL1*n* shown in FIG. 1. In the embodiment shown in FIG. 13, the pixel circuit 1300 includes a photosensitive element (for example, a photodiode PD131 or other photosensitive elements), a floating diffusion portion FD131, a transfer transistor M_TX131, a source follower circuit SF13, a dual floating diffusion transistor M_DFD131, an overflow transistor M_OFG131, and an overflow storage portion 1301. The photodiode PD131 generates photosensitive charges in response to incident light. The transfer transistor M_TX131 is coupled between the photodiode PD131 and the floating diffusion portion FD131. The dual floating diffusion transistor M_DFD131 is coupled between the floating diffusion portion FD131 and the overflow storage portion 1301. The overflow transistor M_OFG131 is coupled between the photodiode PD131 and the overflow storage portion 1301. In an environment of high illumination, excess photosensitive charges of the photodiode PD131 may overflow to the overflow storage portion 1301 through the overflow transistor M_OFG131.

In the embodiment shown in FIG. 13, the overflow storage portion 1301 includes a capacitor (eg, LOFIC LOFIC131), and a switch transistor M_LFG131. The reset circuit 1310 includes a reset transistor M_RST131, and the source follower circuit SF13 includes a source follower transistor M_SF13 and a row select transistor M_RS13. Details of the pixel circuit 1300, the photodiode PD131, the floating diffusion portion FD131, the transfer transistor M_TX131, the source follower circuit SF13, the dual floating diffusion transistor M_DFD131, the LOFIC LOFIC131, the reset circuit 1310, the reset transistor M_RST131, the source follower transistor M_SF13 and the row select transistor M_RS13 shown in FIG. 13 may be found in the descriptions of the pixel circuit 200, the photodiode PD21, the floating diffusion portion FD21, the transfer transistor M_TX21, the source follower circuit SF2, the dual floating diffusion transistor M_DFD21, the LOFIC LOFIC21, the reset circuit 210, the reset transistor M_RST21, the source follower transistor M_SF2 and the row select transistor M_RS2 shown in FIG. 2, and therefore will not be repeated here.

In the embodiment shown in FIG. 13, the control terminal (for example, gate) of the overflow transistor M_OFG131 is coupled to the control circuit 110 to receive a control voltage OFG. In response to the control voltage OFG, the overflow transistor M_OFG131 is turned off. A first terminal of the overflow transistor M_OFG131 is coupled to the photodiode PD131. A second terminal of the overflow transistor M_OFG131 is coupled to the LOFIC LOFIC131 of the overflow storage portion 1301. A first terminal of the switch transistor M_LFG131 is coupled to the first terminal of the LOFIC LOFIC131 and the second terminal of the overflow transistor M_OFG131. A second terminal of the switch transistor M_LFG131 is coupled to the second terminal of the dual floating diffusion transistor M_DFD131. The control terminal (for example, gate) of the switch transistor M_LFG131 is coupled to the control circuit 110 to receive a control voltage LFG. In response to the control voltage LFG, the switch transistor M_LFG131 is turned off.

Figure 14:
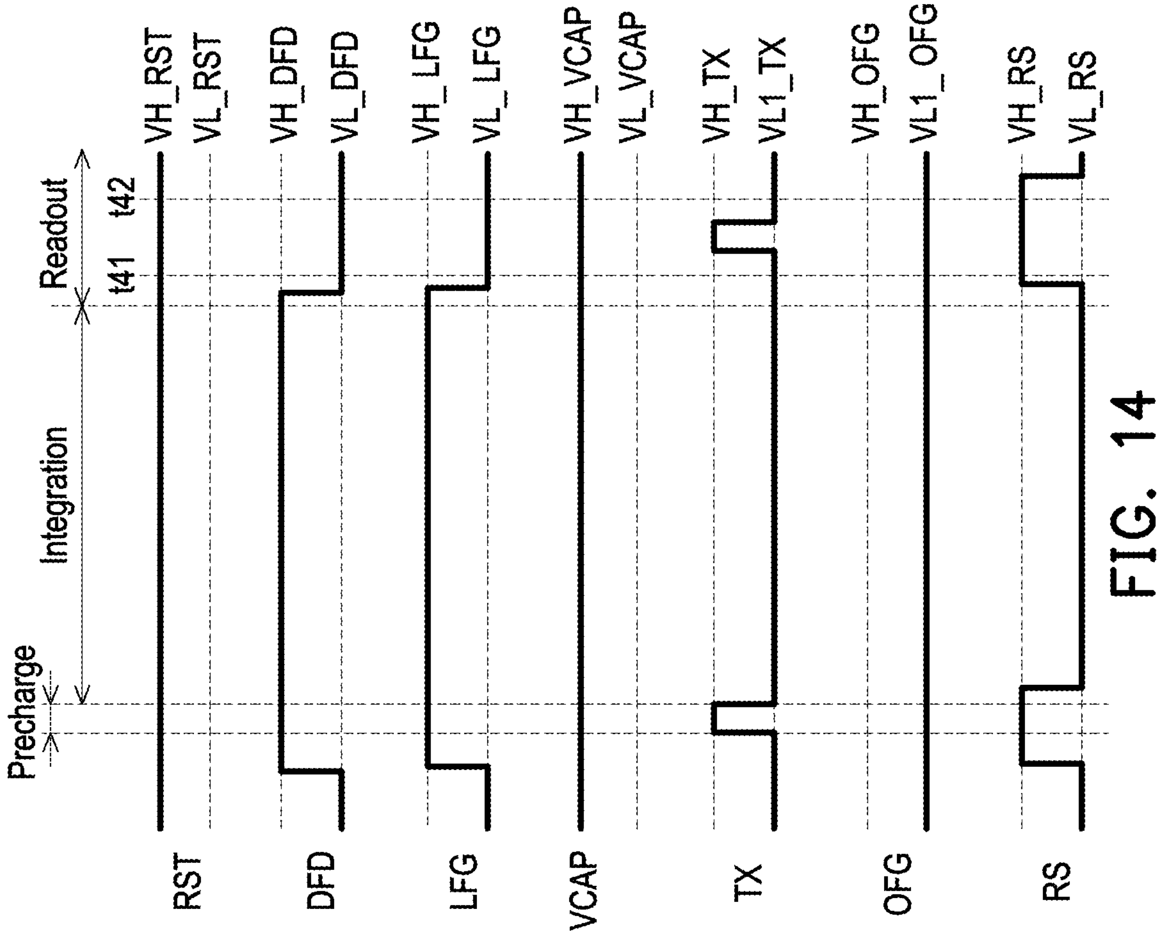
FIG. 14 is a timing diagram illustrating the reset signal, the dual floating diffusion signal, the switch transistor, the floating diffusion capacitor signal, the transfer signal, the control voltage, and the row select signal when the pixel circuit operates in the low illumination sensing mode, according to an embodiment of the disclosure.

FIG. 14 is a timing diagram illustrating the reset signal RST, the dual floating diffusion signal DFD, the control voltage LFG, the floating diffusion capacitor signal VCAP, the control voltage TX, the control voltage OFG, and the row select signal RS when the pixel circuit 1300 operates in the low illumination sensing mode, according to an embodiment of the disclosure. The horizontal axis in FIG. 14 represents time. The signal timing shown in FIG. 14 may serve as one of many examples for the reset signal RST, the dual floating diffusion signal DFD, the control voltage LFG, the floating diffusion capacitor signal VCAP, the control voltage TX, the control voltage OFG, and the row select signal RS illustrated in FIG. 13. In the embodiment shown in FIG. 14, the swing of the reset signal RST is from high level VH_RST to low level VL_RST, the swing of the dual floating diffusion signal DFD is from high level VH_DFD to low level VL_DFD, the swing of the control voltage LFG is from high level VH_LFG to low level VL_LFG, the swing of the floating diffusion capacitor signal VCAP is from high level VH_VCAP to low level VL_VCAP, the swing of the control voltage TX is from high level VH_TX to low level VL1_TX, the swing of the control voltage OFG is from high level VH_OFG to low level VL1_OFG, and the swing of the row select signal RS is from high level VH_RS to low level VL_RS. These levels VH_RST, VL_RST, VH_DFD, VL_DFD, VH_LFG, VL_LFG, VH_VCAP, VL_VCAP, VH_TX, VL1_TX, VH_OFG, VL1_OFG, VH_RS, and VL_RS may be defined according to the actual design and application. For example, the level VH_OFG may be 2.8 V (volts), and the level VL1_OFG may be −1.4 V (but not limited thereto).

Referring to FIG. 13 and FIG. 14, the control circuit 110 performs a precharge operation on the pixel circuit 1300, that is, pulling up the reset signal RST, the dual floating diffusion signal DFD, the control voltage LFG, the floating diffusion capacitor signal VCAP, and the control voltage TX, to reset the photodiode PD131, the floating diffusion portion FD131, and the LOFIC LOFIC131. In response to the pixel circuit 1300 operating in the low illumination sensing mode, the control circuit 110 keeps resetting the floating diffusion portion FD131 and the LOFIC LOFIC131 during the integration period after the precharge operation, that is, continuously pulling up the reset signal RST, the dual floating diffusion signal DFD, the control voltage LFG, and the floating diffusion capacitor signal VCAP, but pulls down the control voltage TX to the level VL1_TX and pulls down the row select signal RS to the level VL_RS. The control voltage OFG is maintained at the level VL1_OFG. In the low illumination sensing mode, the control voltage TX at the lower level VL1_TX (for example, −1.4 V) is applied to the control terminal of the transfer transistor M_TX101 and the control voltage OFG at the lower level VL1_OFG (for example, −1.4 V) is applied to the control terminal of the overflow transistor M_OFG101 during the integration period to suppress the dark current at the Si surface under the transfer transistor M_TX131 and the overflow transistor M_OFG131. Further, the lower levels VL1_TX and VL1_OFG can maintain a higher overflow barrier to prevent the full well capacity (FWC) of the photodiode PD131 from dropping. The signal timing shown in FIG. 14 can be referred to the relevant description of FIG. 4, so no further description is given.

Referring to FIG. 1, and FIG. 13, in response to the pixel circuit 1300 operating in the high illumination sensing mode, the control circuit 110 applies the control voltage OFG at a second level to the control terminal of the overflow transistor M_OFG131 during the integration period to turn off the overflow transistor M_OFG131. The second level may be defined according to the actual design and application, and the second level is higher than the first level. For example, the second level may be a negative voltage level.

Figure 15:
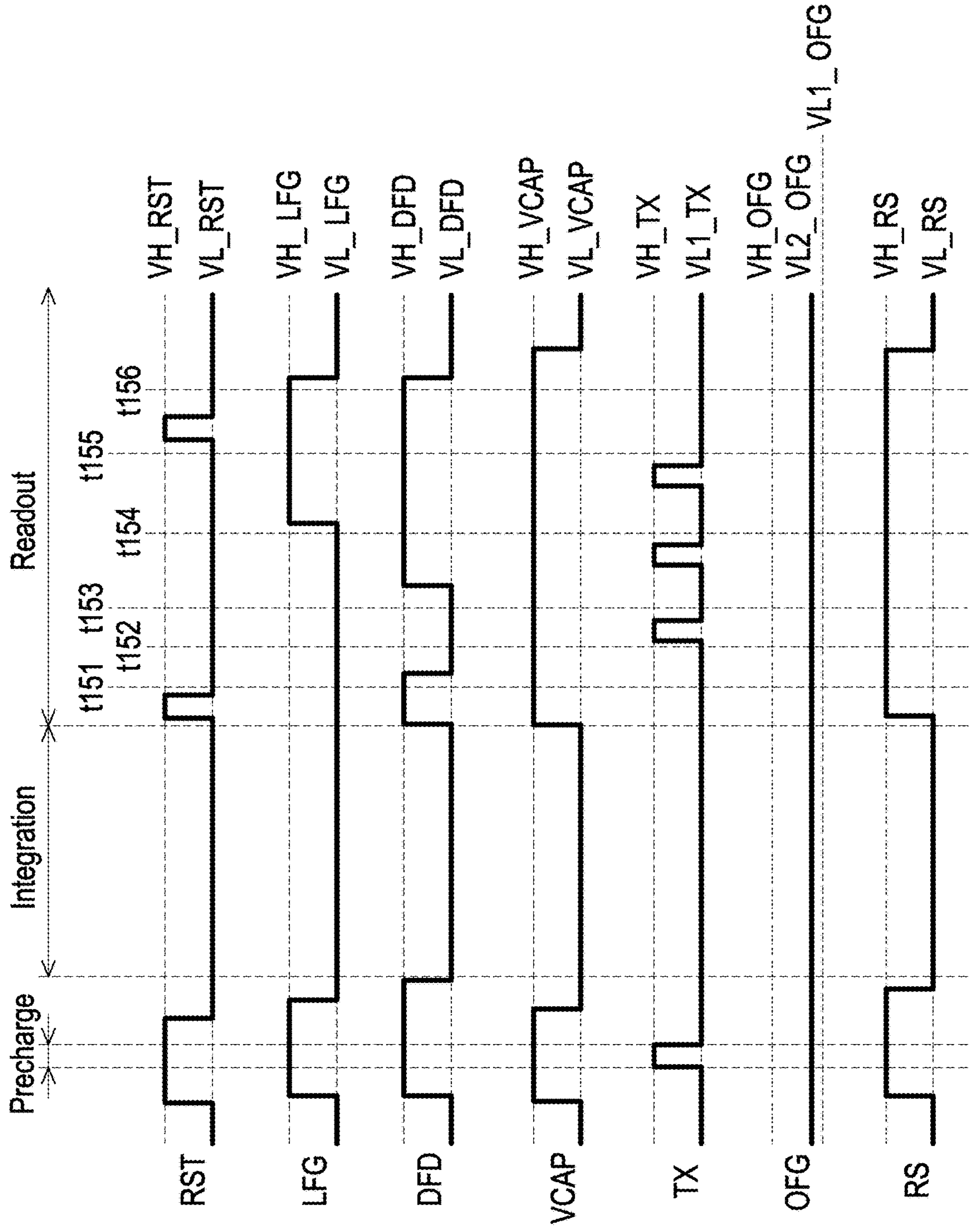
FIG. 15 is a timing diagram illustrating the reset signal, the dual floating diffusion signal, the switch transistor, the floating diffusion capacitor signal, the transfer signal, the control voltage, and the row select signal when the pixel circuit operates in the high illumination sensing mode, according to an embodiment of the disclosure.

FIG. 15 is a timing diagram illustrating the reset signal RST, the dual floating diffusion signal DFD, the control voltage LFG, the floating diffusion capacitor signal VCAP, the control voltage TX, the control voltage OFG, and the row select signal RS when the pixel circuit 1300 operates in the high illumination sensing mode, according to an embodiment of the disclosure. The horizontal axis in FIG. 15 represents time. The signal timing shown in FIG. 15 may serve as one of many examples for the reset signal RST, the dual floating diffusion signal DFD, the control voltage LFG, the floating diffusion capacitor signal VCAP, the control voltage TX, the control voltage OFG, and the row select signal RS illustrated in FIG. 13. In the embodiment shown in FIG. 15, the swing of the reset signal RST is from high level VH_RST to low level VL_RST, the swing of the dual floating diffusion signal DFD is from high level VH_DFD to low level VL_DFD, the swing of the control voltage LFG is from high level VH_LFG to low level VL_LFG, the swing of the floating diffusion capacitor signal VCAP is from high level VH_VCAP to low level VL_VCAP, the swing of the control voltage TX is from high level VH_TX to low level VL1_TX, the swing of the control voltage OFG is from high level VH_OFG to low level VL2_OFG, and the swing of the row select signal RS is from high level VH_RS to low level VL_RS. These levels VH_RST, VL_RST, VH_DFD, VL_DFD, VH_LFG, VL_LFG, VH_VCAP, VL_VCAP, VH_TX, VL1_TX, VH_OFG, VL2_OFG, VH_RS, and VL_RS may be defined according to the actual design and application. For example, the level VH_OFG may be 2.8 V, and the level VL2_OFG may be −1.0 V (but not limited thereto). The level VL2_OFG is higher than the level VL1_OFG shown in FIG. 14.

Referring to FIG. 13 and FIG. 15, the control circuit 110 performs a precharge operation on the pixel circuit 1000, that is, pulling up the reset signal RST, the control voltage LFG, the dual floating diffusion signal DFD, the floating diffusion capacitor signal VCAP, and the control voltage TX, to reset the photodiode PD131, the floating diffusion portion FD131, a second floating diffusion portion FD133, and the LOFIC LOFIC131. In response to the pixel circuit 1300 operating in the high illumination sensing mode, the control circuit 110 stops resetting the LOFIC LOFIC131 during the integration period after the precharge operation, that is, pulling down the reset signal RST, the control voltage LFG, the floating diffusion capacitor signal VCAP, and the control voltage TX, to enable the LOFIC LOFIC131 to store the overflow charges from the photodiode PD131. The control voltage OFG is maintained at the level VL2_OFG. In the high illumination sensing mode, the control voltage OFG at the higher level VL2_OFG (for example, −1.0 V, higher than the level VL1_OFG shown in FIG. 14) is applied to the control terminal of the overflow transistor M_OFG131 during the integration period, to ensure that the overflow charges of the photodiode PD131 overflow through the overflow transistor M_OFG131 to the LOFIC LOFIC131. Therefore, the pixel circuit 1300 can avoid blooming.

In response to the pixel circuit 1300 operating in the high illumination sensing mode, the control circuit 110 selectively switches the control voltage TX to one of the level VL1_TX and the level VH_TX during the readout period after the integration period. The control voltage TX at the level VH_TX may turn on the transfer transistor M_TX131. The readout circuit 130 reads out the overflow charge value of the floating diffusion portion FD131 and the second floating diffusion portion FD133 through the readout line RL13 and the source follower circuit SF13 at time point t151 as a dark value of low conversion gain (LCG). After the dual floating diffusion transistor M_DFD131 turns off, the readout circuit 130 reads out the original charge value of the floating diffusion portion FD131 through the readout line RL13 and the source follower circuit SF13 at time point t152 as a dark value of high conversion gain (HCG).

After time point t152, the transfer transistor M_TX131 transfers the photosensitive charges of the photodiode PD131 to the floating diffusion portion FD131. The readout circuit 130 reads out the photosensitive charges of the floating diffusion portion FD131 through the readout line RL13 and the source follower circuit SF13 at time point t153 as a signal value of HCG. The difference between the original charge value read out at time point t152 and the photosensitive charge value read out at time point t153 serves as the HCG sensing result. Therefore, the pixel circuit 1300 operating in the high illumination sensing mode can realize the CDS function. The HCG sensing result may serve as the low illumination sensing result (applicable to low illumination incident light).

After time point t153, the dual floating diffusion transistor M_DFD131 turns on, and after that the transfer transistor M_TX131 transfers the photosensitive charges of the photodiode PD131 to the floating diffusion portion FD131 and the second floating diffusion portion FD133. The readout circuit 130 reads out the photosensitive charges of the floating diffusion portion FD131 and the second floating diffusion portion FD133 through the readout line RL13 and the source follower circuit SF13 at time point t154 as a signal value of LCG. The difference between the original charge value read out at time point t151 and the photosensitive charge value read out at time point t154 serves as the LCG sensing result. The LCG sensing result may serve as the medium illumination sensing result (applicable to medium illumination incident light).

After time point t154, the switch transistor M_LFG131 turns on, and after that the transfer transistor M_TX131 transfers the photosensitive charges of the photodiode PD131 to the floating diffusion portion FD131, the second floating portion FD133, and the LOFIC LOFIC131. The readout circuit 130 reads out the photosensitive charges of the floating diffusion portion FD131, the second floating portion FD133, and the LOFIC LOFIC131 through the readout line RL13 and the source follower circuit SF13 at time point t155 as a signal value of high illuminance. After time point t155, the pixel circuit 1300 is reset. The readout circuit 130 reads out the initialization charge of the floating diffusion portion FD131, the second floating portion FD133, and the LOFIC LOFIC131 through the readout line RL13 and the source follower circuit SF13 at time point t156 as a dark value of high illumination. The difference between the initialization charge value read out at time point t156 and the photosensitive charge value read out at time point t155 serves as the high illumination sensing result (applicable to high illumination incident light).

In summary, the pixel circuit 1300 selectively operates in one of the low illumination sensing mode and the high illumination sensing mode to realize the HDR function. When the pixel circuit 1300 operates in the low illumination sensing mode, the control terminal of the overflow transistor M_OFG131 is applied with the control voltage OFG at the first level (for example, level VL1_OFG) during the integration period, so that the photodiode PD131 has an appropriate full well capacity (FWC). In response to the pixel circuit 1300 operating in the low illumination sensing mode, the floating diffusion portion FD131, the second floating diffusion portion FD133 and the LOFIC LOFIC131 are continuously reset during the integration period. In response to the pixel circuit 1300 operating in the high illumination sensing mode, the LOFIC LOFIC131 stop being reset during the integration period to store the overflow charges from the photodiode PD131. The overflow charges may lower the voltages of a floating diffusion node FD132. However, when the voltages of the floating diffusion node FD132 becomes lower, the overflow barrier under the overflow transistor M_OFG131 becomes higher (that is, it becomes more difficult for the overflow charges of the photodiode PD131 to pass through the overflow transistor M_OFG131 to the floating diffusion node FD132), which increases the risk of blooming effect. To reduce the risk, when the pixel circuit 1300 operates in the high illumination sensing mode, the control terminal of the overflow transistor M_OFG131 is applied with the control voltage OFG at the higher second level (for example, level VL2_OFG, and the level VL2_OFG is higher than the level VL1_OFG) during the integration period to turn off the overflow transistor M_OFG131. The higher control voltage OFG ensures that the overflow charges of the photodiode PD131 overflow through the overflow transistor M_OFG131 to the LOFIC LOFIC131, to reduce the risk of blooming. Therefore, the pixel circuit 1300 achieves blooming suppression.

Figure 16:
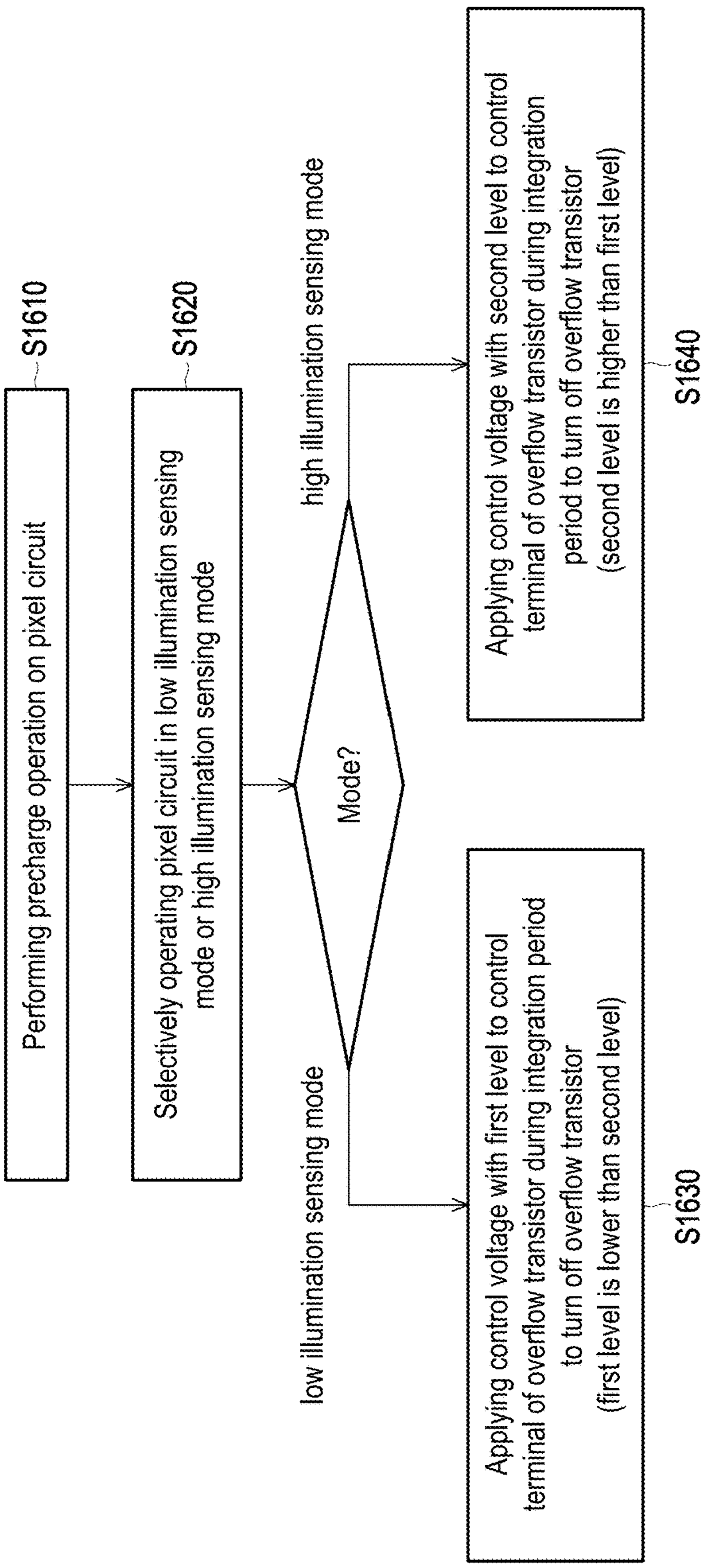
FIG. 16 is a flow chart of an operation method of a pixel circuit according to another embodiment of the disclosure.

FIG. 16 is a flow chart of an operation method of a pixel circuit according to another embodiment of the disclosure. Referring to FIG. 1 and FIG. 16, the control circuit 110 performs a precharge operation on the pixel circuit (e.g. pixel circuit 1000 or 1300) in step S1610 to reset the photodiode (e.g. photodiode PD101 or PD131), the floating diffusion portion (e.g. floating diffusion portion FD101 or FD131), the second floating diffusion portion (e.g. FD133), and the LOFIC (e.g. LOFIC LOFIC101 or LOFIC131). Based on the control of the control circuit 110, the pixel circuit selectively operates in one of the low illumination sensing mode and the high illumination sensing mode (step S1620). In response to the pixel circuit operating in the low illumination sensing mode, the control circuit 110 applies the control voltage OFG at a first level to the control terminal of the overflow transistor (e.g. overflow transistor M_OFG101 or M_OFG131) during the integration period to turn off the overflow transistor (step S1630). The first level may be defined according to the actual design and application. For example, the first level may be a negative voltage level. In response to the pixel circuit operating in the high illumination sensing mode, the control circuit 110 applies the control voltage OFG at a second level to the control terminal of the overflow transistor (e.g. overflow transistor M_OFG101 or M_OFG131) during the integration period to turn off the overflow transistor (step S1640). The second level may be defined according to the actual design and application, and the second level is higher than the first level in step S1630. For example, the second level may be a negative voltage level.

Although the disclosure has been described with reference to the foregoing embodiments, the embodiments are not intended to limit the disclosure. Any person having ordinary skill in the art may make changes and modifications without departing from the spirit and scope of the disclosure. Therefore, the scope of the disclosure will be defined by the appended claims.

What is claimed is:

1. An image sensor comprising:

a control circuit; and a pixel array controlled by the control circuit, wherein each pixel circuit of the pixel array comprises:

a first photosensitive element;

a floating diffusion portion;

a first transfer transistor coupled between the first photosensitive element and the floating diffusion portion;

a source follower circuit coupled between a corresponding readout line of the pixel array and the floating diffusion portion;

a dual floating diffusion transistor having a first terminal coupled to the floating diffusion portion; and a first capacitor having a first terminal coupled to a second terminal of the dual floating diffusion transistor, wherein each pixel circuit of the pixel array selectively operates in one of a low illumination sensing mode and a high illumination sensing mode based on control of the control circuit;

in response to the pixel circuit operating in the low illumination sensing mode, the control circuit applies a control voltage with a first level to a control terminal of the first transfer transistor during an integration period to turn off the first transfer transistor; and in response to the pixel circuit operating in the high illumination sensing mode, the control circuit applies the control voltage with a second level higher than the first level to the control terminal of the first transfer transistor during the integration period to turn off the first transfer transistor.

2. The image sensor according to claim 1, wherein the first level and the second level are negative voltage levels.

3. The image sensor according to claim 1, wherein a capacity of the first capacitor is greater than a capacity of the floating diffusion portion.

4. The image sensor according to claim 1, wherein the first photosensitive element comprises a photodiode, and the first capacitor comprises a metal-oxide-metal capacitor or a three-dimensional metal-insulator-metal capacitor or a metal oxide semiconductor capacitor as a lateral overflow integration capacitor.

5. The image sensor according to claim 1, wherein the control circuit performs a precharge operation on the pixel circuit to reset the first photosensitive element, the floating diffusion portion, and the first capacitor;

in response to the pixel circuit operating in the low illumination sensing mode, the control circuit keeps resetting the floating diffusion portion and the first capacitor during the integration period after the precharge operation; and in response to the pixel circuit operating in the high illumination sensing mode, the control circuit stops resetting the floating diffusion portion and the first capacitor during the integration period after the precharge operation to enable the floating diffusion portion and the first capacitor to store overflow charges from the first photosensitive element.

6. The image sensor according to claim 1, wherein the source follower circuit comprises:

a source follower transistor having a control terminal coupled to the floating diffusion portion, wherein a first terminal of the source follower transistor is coupled to a pixel voltage source; and a row select transistor having a control terminal coupled to the control circuit to receive a row select signal, wherein a first terminal of the row select transistor is coupled to a second terminal of the source follower transistor, and a second terminal of the row select transistor is coupled to the corresponding readout line.

7. The image sensor according to claim 1, wherein a second terminal of the first capacitor is coupled to the control circuit to receive a floating diffusion capacitor signal, and the image sensor further comprises:

a reset circuit coupled to the second terminal of the dual floating diffusion transistor, wherein the reset circuit is controlled by the control circuit to selectively reset the pixel circuit.

8. The image sensor according to claim 7, wherein the reset circuit comprises:

a reset transistor coupled between the second terminal of the dual floating diffusion transistor and a reset voltage source, wherein the reset transistor switches in response to a reset signal of the control circuit;

in response to the pixel circuit operating in the low illumination sensing mode, the reset transistor is turned on during the integration period; and in response to the pixel circuit operating in the high illumination sensing mode, the reset transistor is turned off during the integration period.

9. The image sensor according to claim 1, wherein in response to the pixel circuit operating in the low illumination sensing mode, the control circuit selectively switches the control voltage to one of the first level and a third level during a readout period after the integration period, wherein the third level is used to turn on the first transfer transistor; and in response to the pixel circuit operating in the high illumination sensing mode, the control circuit selectively switches the control voltage to one of the second level and the third level during the readout period.

10. The image sensor according to claim 1, wherein in response to the pixel circuit operating in the low illumination sensing mode, the control circuit selectively switches the control voltage to one of the first level and a third level during a readout period after the integration period, wherein the third level is used to turn on the first transfer transistor; and in response to the pixel circuit operating in the high illumination sensing mode, the control circuit selectively switches the control voltage to one of the first level and the third level during the readout period.

11. The image sensor according to claim 1, wherein the pixel circuit further comprises:

a second photosensitive element; and a second transfer transistor coupled between the second photosensitive element and the floating diffusion portion, wherein in response to the pixel circuit operating in the low illumination sensing mode, the control circuit applies the control voltage with the first level to a control terminal of the second transfer transistor during the integration period to turn off the second transfer transistor; and in response to the pixel circuit operating in the high illumination sensing mode, the control circuit applies the control voltage with the second level to the control terminal of the second transfer transistor during the integration period to turn off the second transfer transistor.

12. The image sensor according to claim 1, wherein the pixel circuit further comprises:

a second photosensitive element being adjacent to the first photosensitive element; and a second transfer transistor coupled between the second photosensitive element and the floating diffusion portion, wherein in response to the pixel circuit operating in the low illumination sensing mode, the control circuit applies the control voltage with the first level to a control terminal of the second transfer transistor during the integration period to turn off the second transfer transistor; and in response to the pixel circuit operating in the high illumination sensing mode, the control circuit applies the control voltage with the first level to the control terminal of the second transfer transistor during the integration period to turn off the second transfer transistor.

13. The image sensor according to claim 1, wherein the pixel circuit further comprises:

a switch transistor having a first terminal coupled to the second terminal of the dual floating diffusion transistor;

a second capacitor having a first terminal coupled to a second terminal of the switch transistor; and a reset circuit coupled to the second terminal of the switch transistor, wherein the reset circuit is controlled by the control circuit to selectively reset the pixel circuit.

14. The image sensor according to claim 13, wherein a capacity of the first capacitor is greater than a capacity of the floating diffusion portion, and a capacity of the second capacitor is greater than the capacity of the first capacitor.

15. The image sensor according to claim 13, wherein the first photosensitive element comprises a photodiode, the first capacitor comprises a metal-oxide-metal capacitor or a metal oxide semiconductor capacitor as a first lateral overflow integration capacitor, and the second capacitor comprises a three-dimensional metal-insulator-metal capacitor or a metal oxide semiconductor capacitor as a second lateral overflow integration capacitor.

16. An operation method of a pixel circuit, comprising:

selectively operating the pixel circuit in one of a low illumination sensing mode and a high illumination sensing mode, wherein a first transfer transistor of the pixel circuit is coupled between a first photosensitive element of the pixel circuit and a floating diffusion portion of the pixel circuit, a source follower circuit of the pixel circuit is coupled between a corresponding readout line of the pixel circuit and the floating diffusion portion, a first terminal of a dual floating diffusion transistor of the pixel circuit is coupled to the floating diffusion portion, and a first terminal of a first capacitor of the pixel circuit is coupled to a second terminal of the dual floating diffusion transistor;

performing a precharge operation on the pixel circuit to reset the first photosensitive element, the floating diffusion portion, and the first capacitor;

in response to the pixel circuit operating in the low illumination sensing mode, applying a control voltage with a first level to a control terminal of the first transfer transistor during an integration period after the precharge operation to turn off the first transfer transistor; and in response to the pixel circuit operating in the high illumination sensing mode, applying the control voltage with a second level higher than the first level to the control terminal of the first transfer transistor during the integration period to turn off the first transfer transistor.

17. The operation method according to claim 16, wherein the first level and the second level are negative voltage levels.

18. The operation method according to claim 16, wherein a capacity of the first capacitor is greater than a capacity of the floating diffusion portion.

19. The operation method according to claim 16, wherein the first photosensitive element comprises a photodiode, and the first capacitor comprises a metal-oxide-metal capacitor or a three-dimensional metal-insulator-metal capacitor or a metal oxide semiconductor capacitor as a lateral overflow integration capacitor.

20. The operation method according to claim 16, further comprising:

in response to the pixel circuit operating in the low illumination sensing mode, keeping resetting the floating diffusion portion and the first capacitor during the integration period after the precharge operation; and in response to the pixel circuit operating in the high illumination sensing mode, stopping resetting the floating diffusion portion and the first capacitor during the integration period after the precharge operation to enable the floating diffusion portion and the first capacitor to store overflow charges from the first photosensitive element.

21. The operation method according to claim 16, wherein a second terminal of the first capacitor receives a floating diffusion capacitor signal, a reset circuit of the pixel circuit is coupled to the second terminal of the dual floating diffusion transistor, and the operation method further comprises:

selectively resetting the pixel circuit by the reset circuit.

22. The operation method according to claim 21, further comprising:

switching a reset transistor of the reset circuit in response to a reset signal, wherein the reset transistor is coupled between the second terminal of the dual floating diffusion transistor and a reset voltage source;

in response to the pixel circuit operating in the low illumination sensing mode, turning on the reset transistor during the integration period; and in response to the pixel circuit operating in the high illumination sensing mode, turning off the reset transistor during the integration period.

23. The operation method according to claim 16, further comprising:

in response to the pixel circuit operating in the low illumination sensing mode, selectively switching the control voltage to one of the first level and a third level during a readout period after the integration period, wherein the third level is used to turn on the first transfer transistor; and in response to the pixel circuit operating in the high illumination sensing mode, selectively switching the control voltage to one of the second level and the third level during the readout period.

24. The operation method according to claim 16, further comprising:

in response to the pixel circuit operating in the low illumination sensing mode, selectively switching the control voltage to one of the first level and a third level during a readout period after the integration period, wherein the third level is used to turn on the first transfer transistor; and in response to the pixel circuit operating in the high illumination sensing mode, selectively switching the control voltage to one of the first level and the third level during the readout period.

25. The operation method according to claim 16, wherein the pixel circuit further comprises a second photosensitive element and a second transfer transistor, the second transfer transistor is coupled between the second photosensitive element and the floating diffusion portion, and the operation method further comprises:

in response to the pixel circuit operating in the low illumination sensing mode, applying the control voltage with the first level to a control terminal of the second transfer transistor during the integration period to turn off the second transfer transistor; and in response to the pixel circuit operating in the high illumination sensing mode, applying the control voltage with the second level to the control terminal of the second transfer transistor during the integration period to turn off the second transfer transistor.

26. The operation method according to claim 16, wherein the pixel circuit further comprises a second photosensitive element and a second transfer transistor, the second photosensitive element is adjacent to the first photosensitive element, the second transfer transistor is coupled between the second photosensitive element and the floating diffusion portion, and the operation method further comprises:

in response to the pixel circuit operating in the low illumination sensing mode, applying the control voltage with the first level to a control terminal of the second transfer transistor during the integration period to turn off the second transfer transistor; and in response to the pixel circuit operating in the high illumination sensing mode, applying the control voltage with the first level to the control terminal of the second transfer transistor during the integration period to turn off the second transfer transistor.

* * * * *